US008659809B2

(12) United States Patent
Watanabe

(10) Patent No.: US 8,659,809 B2
(45) Date of Patent: Feb. 25, 2014

(54) IMAGE FORMING APPARATUS PROVIDED WITH A COLOR MISREGISTRATION CORRECTION PROCESSING UNIT

(75) Inventor: Masaru Watanabe, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 472 days.

(21) Appl. No.: 12/949,444

(22) Filed: Nov. 18, 2010

(65) Prior Publication Data

US 2011/0128599 A1 Jun. 2, 2011

(30) Foreign Application Priority Data

Nov. 30, 2009 (JP) ................................ 2009-271863
Jul. 20, 2010 (JP) ................................ 2010-162995

(51) Int. Cl.
*G06K 15/00* (2006.01)

(52) U.S. Cl.
USPC ............ 358/518; 358/1.18; 358/504; 399/69; 399/33; 399/44; 399/94; 399/301

(58) Field of Classification Search
USPC ......... 358/1.18, 518, 504; 399/69, 33, 44, 94, 399/301
See application file for complete search history.

(56) References Cited

U.S. PATENT DOCUMENTS 5,579,446 A * 11/1996 Naik et al. ..................... 358/1.9
2004/0057062 A1* 3/2004 Harada et al. .................. 358/1.9
2004/0100550 A1* 5/2004 Bannai et al. ................. 347/232
2005/0041990 A1* 2/2005 Sugiyama ........................ 399/49
2006/0029407 A1* 2/2006 Sakamoto ........................ 399/44
2008/0253786 A1* 10/2008 Isobe et al. ...................... 399/69
2008/0279599 A1* 11/2008 Nagatsuka .................... 399/301

FOREIGN PATENT DOCUMENTS

JP 2005-165220 6/2005

* cited by examiner

*Primary Examiner* — Benny Q Tieu
*Assistant Examiner* — Quyen V Ngo
(74) *Attorney, Agent, or Firm* — Frommer Lawrence & Haug LLP

(57) ABSTRACT

An image forming apparatus having a temperature detection unit that detects a current interior temperature based on a detection signal from a temperature sensor. A temperature change detection unit calculates a difference between the current interior temperature and an interior temperature detected in a last color misregistration correction processing as a temperature change amount. When the temperature change amount is equal to or higher than a threshold, a determination unit determines that a color misregistration correction operation needs to be executed. A mode setting unit determines whether a monochrome printing processing is currently carried out. When the monochrome printing processing is currently carried out, the mode setting unit sets an estimation color misregistration correction mode as a color misregistration correction mode, and an estimation color misregistration correction processing unit executes an estimation color misregistration correction processing based on a previously determined color misregistration amount in accordance with the interior temperature.

12 Claims, 12 Drawing Sheets

IMAGE FORMING APPARATUS PROVIDED WITH A COLOR MISREGISTRATION CORRECTION PROCESSING UNIT

INCORPORATION BY REFERENCE

This application is based upon and claims the benefit of priority from the corresponding Japanese Patent application No. 2009-271863, filed Nov. 30, 2009, and Japanese Patent application No. 2010-162995, filed Jul. 20, 2010, the entire contents of which are incorporated herein by reference.

FIELD OF THE INVENTION

The present disclosure relates to an image forming apparatus capable of forming a color image.

BACKGROUND OF THE INVENTION

Up to now, an image forming apparatus having a so-called tandem structure is proposed in which a plurality of image forming units for forming toner images of respective different colors such as cyan, magenta, and yellow are disposed in one direction for arrangement. In the above-mentioned image forming apparatus, the toner images of the respective colors are overlapped and transferred on paper conveyed in the arrangement direction of the image forming units.

Also, in the image forming apparatus of this type, because of, for example, an installment error of the image fowling units or the LED print heads in the exposure units or error of an operation of a photosensitive drum or the like due to an increase in an interior temperature generated owing to operations of the image forming unit, formation positions of the toner images of the respective colors may be mutually misregistered. As a result of this misregistration, a formation of an image having a color different from a target image, which is so-called color misregistration, occurs. Thus, an image forming apparatus provided with a function of performing a color misregistration correction processing for correcting the color misregistration has been proposed.

A technology related to the color misregistration correction processing has been proposed as follows. With an aim to avoid conducting a wasteful color misregistration correction, each pattern for a color misregistration check is formed in the image forming units of the respective colors. The pattern for the color misregistration check formed by transferring the color misregistration check patterns on an intermediate transfer belt is detected. On the basis of the detection result, a color misregistration check mode is executed for determining whether or not the color misregistration correction is to be executed in conjunction with other correction modes (e.g., image correction processing may include surface potential correction processing on an image bearing member of image forming means, highest density correction processing, and tone correction processing).

However, as the color misregistration check mode in the above-mentioned technology is a mode for causing the image forming units of the respective colors to respectively form the patterns for the color misregistration check, when a monochrome printing operation is carried out, a state is established in which the image forming operations by the image forming units of the colors except for black are prohibited, and a check on the color misregistration amount cannot be performed. Therefore, it is necessary to carry out the check on the color misregistration amount and the color misregistration correction after a situation is established in which a color printing operation is to be performed, which causes a user to wait for a relatively long time until the correction ends.

Also, a technology related to the color misregistration correction processing has been proposed as follows. When a normal state is returned from a power save mode, a fixing temperature is detected, and in a case where the fixing temperature is lower than or equal to a predetermined temperature, a first color misregistration correction is carried out. A first temperature at that time and a first color misregistration correction amount are stored in a memory. Furthermore, in a case where the fixing temperature is equal to or higher than the predetermined temperature, a second color misregistration correction is carried out, a second temperature at that time and a second color misregistration correction amount are stored in the memory. A magnitude between the fixing temperature at a subsequent time t and the second temperature is compared. In a case where the fixing temperature at the time t is higher than or equal to the second temperature, the color misregistration correction is performed by using the second color misregistration correction amount. In a case where the fixing temperature at the time t is lower than the second temperature, the color misregistration correction is performed by using the first color misregistration correction amount.

Also, according to the above-mentioned technology, in order to carry out an operation of correcting the color misregistration at the time t (hereinafter, this color misregistration correction will be referred as main correction), when the normal mode is returned from the power save mode, it is necessary to carry out the first color misregistration correction and the second color misregistration correction described above for obtaining the color misregistration correction amount eventually used for the main correction. For that reason, while the first color misregistration correction and the second color misregistration correction are carried out, a state is thereby established in which the image formation cannot be performed. Therefore, according to the above-mentioned technology, such a problem occurs that the user needs to wait for a time used for carrying out the first color misregistration correction and the second color misregistration correction described above.

Furthermore, according to the above-mentioned technology, even in a case where eventually the main correction does not need to be performed, as the first color misregistration correction and the second color misregistration correction described above for checking the necessity of the color misregistration correction are carried out, a toner consumption amount is accordingly increased as compared with a configuration where only the main correction is carried out.

In order to suppress this toner consumption amount, it is conceivable to adopt means for performing the drive of a developing device which is carried out at the time of the color misregistration correction in a state where the toner consumption is suppressed as much as possible. However, in a case where the operation of performing the drive of the developing device is repeatedly executed in a state where the toner consumption is suppressed as much as possible, substantial mechanical stress affects toner in the developing device, and such a state may be established that the toner is abnormally charged. As such, a state may be established in which an electrostatic latent image is not appropriately developed even when developing conditions such as a developing bias is adjusted in some cases.

SUMMARY OF THE INVENTION

In view of the above, various embodiments of the present invention, in accordance with the present disclosure, provide an image forming apparatus capable of satisfying both prevention of an increase in time required from a printing instruction to a printing completion and assurance of accuracy in a color misregistration correction while the toner consumption amount at the time of the color misregistration correction is suppressed.

An image forming apparatus provided with a color misregistration correction processing unit according to an aspect of the present disclosure includes: an image forming unit configured to form color images by using toners in accordance with different colors; a detection color misregistration correction processing unit configured to respectively form for each of the respective toners one or more color misregistration correction patches of predetermined patterns, respectively detect positions of the respective color misregistration correction patches, detect a color misregistration amount on the basis of the detected positions of the respective color misregistration correction patches, and selectively perform a color misregistration correction processing for performing a color misregistration correction on the basis of the detected color misregistration amount; an interior temperature monitoring unit configured to monitor an interior temperature of the image forming unit; a determination unit configured to determine whether or not a execution of the color misregistration correction is necessary on the basis of whether or not the interior temperature detected by the interior temperature monitoring unit is put in a predetermined state; a storage unit configured to store information representing at least one color misregistration amount with respect to the interior temperature that may be detected by the interior temperature monitoring unit; an estimation color misregistration correction processing unit configured to read out, based on the interior temperature of the image forming unit detected by the interior temperature monitoring unit, the color misregistration amount corresponding to the interior temperature from the storage unit and perform a color misregistration correction processing on the basis of the color misregistration amount; and a mode setting unit configured to switch a color misregistration correction mode of the image forming apparatus between a detection color misregistration correction mode of instructing the detection color misregistration correction processing unit to perform the color misregistration correction processing and an estimation color misregistration correction mode of instructing the estimation color misregistration correction processing unit to perform the color misregistration correction processing.

The above and other objects, features, and advantages of various embodiments of the present invention will be more apparent from the following detailed description of embodiments taken in conjunction with the accompanying drawings.

In this text, the terms “comprising”, “comprise”, “comprises” and other forms of “comprise” can have the meaning ascribed to these terms in U.S. Patent Law and can mean “including”, “include”, “includes” and other forms of “include”.

Various features of novelty which characterize various aspects of the invention are pointed out in particularity in the claims annexed to and forming a part of this disclosure. For a better understanding of the invention, operating advantages and specific objects that may be attained by its uses, reference is made to the accompanying descriptive matter in which exemplary embodiments of the invention are illustrated in the accompanying drawings in which corresponding components are identified by the same reference numerals.

BRIEF DESCRIPTION OF THE DRAWINGS

The following detailed description, given by way of example, but not intended to limit the invention solely to the specific embodiments described, may best be understood in conjunction with the accompanying drawings, in which.

DETAILED DESCRIPTION OF THE EMBODIMENTS

Reference will now be made in detail to various embodiments of the invention, one or more examples of which are illustrated in the accompanying drawings. Each example is provided by way of explanation of the invention, and by no way limiting the present invention. In fact, it will be apparent to those skilled in the art that various modifications, combinations, additions, deletions and variations can be made in the present invention without departing from the scope or spirit of the present invention. For instance, features illustrated or described as part of one embodiment can be used in another embodiment to yield a still further embodiment. It is intended that the present invention covers such modifications, combinations, additions, deletions, applications and variations that come within the scope of the appended claims and their equivalents.

Figure 1:
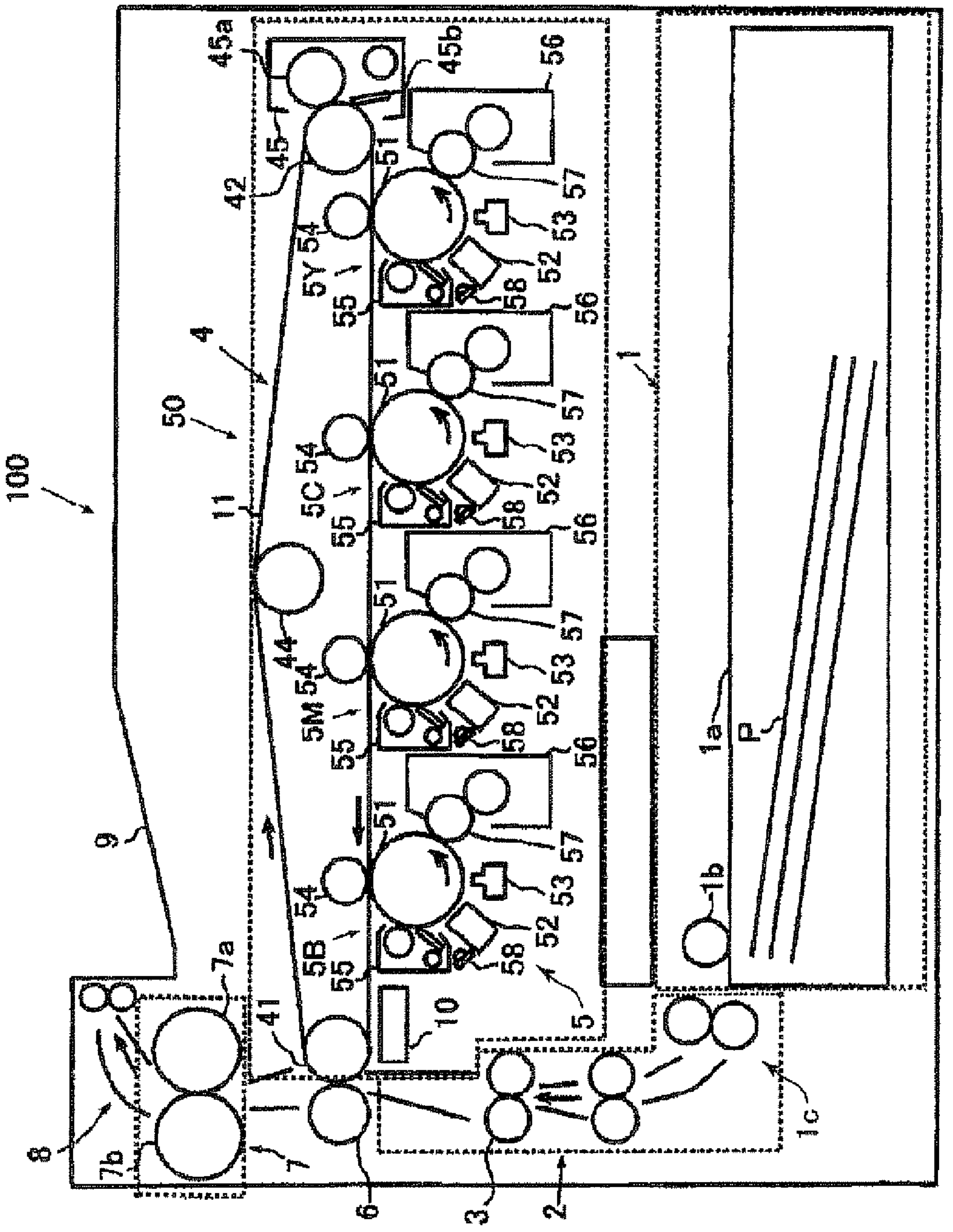
FIG. 1 shows a configuration of an image forming apparatus according to some embodiments of the present invention.

Embodiments of an image forming apparatus provided with a color misregistration correction processing unit according to some aspects of the present disclosure will be described. FIG. 1 shows an illustrative internal configuration of an image forming apparatus 100 implemented as a printer according to an illustrative embodiment of the image forming apparatus, which may in various embodiments be implemented, for example, as a copier, facsimile, scanner, or multi-functional peripheral.

Figure 3:
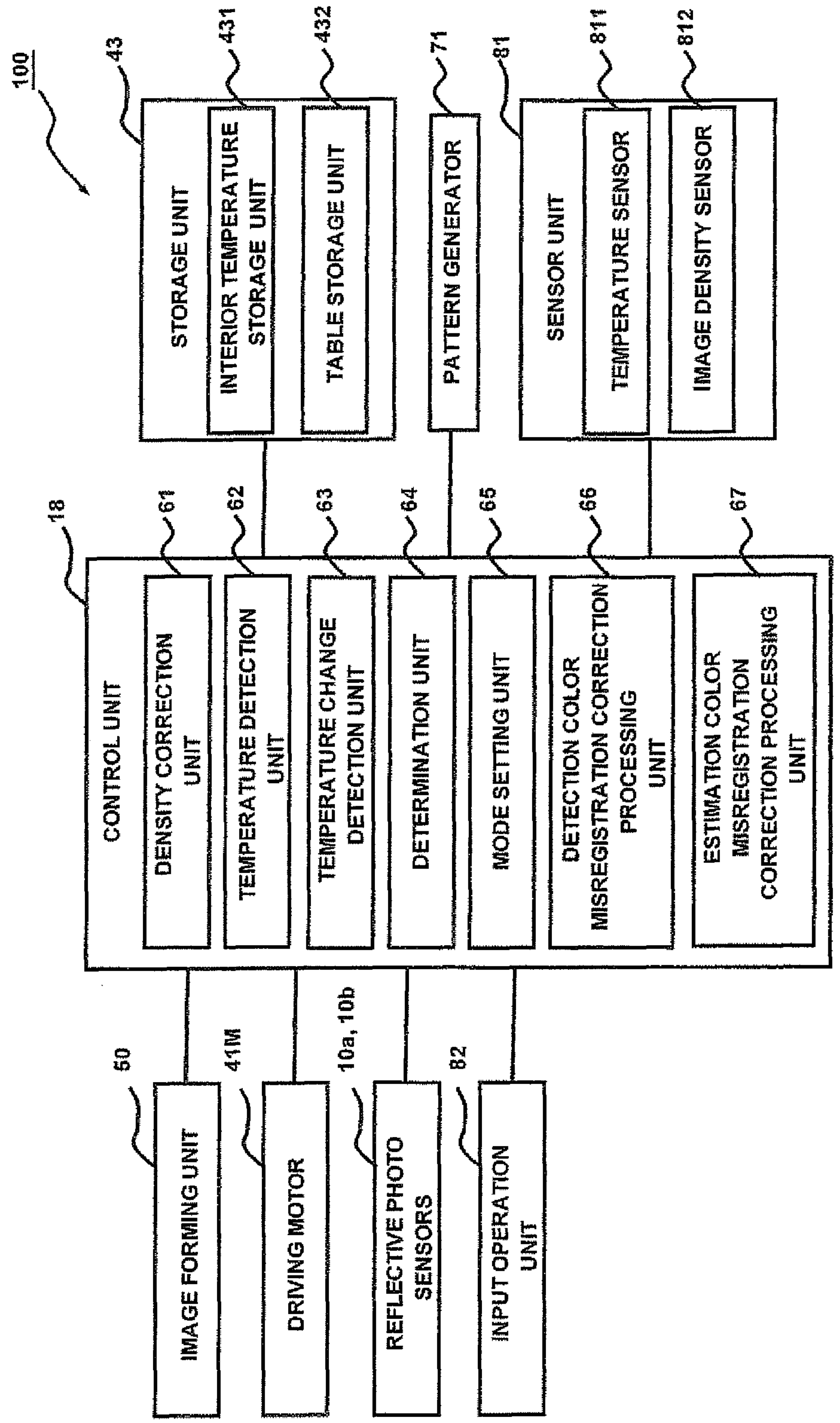
FIG. 3 is a block diagram of an electrical configuration of an image forming apparatus according to some embodiments of the present invention.

Image forming apparatus 100 includes a paper feed unit 1, a vertical conveying path 2, a registration roller pair 3, an intermediate transfer unit 4, an image forming unit 50, a secondary transfer unit 6, a fixing unit 7, a discharge conveying path 8, a discharge tray 9, a reflective photosensor 10, and a control unit 18 (FIG. 3). The depicted illustrative image fanning unit 50 is provided with four image forming mechanisms 5B, 5M, 5C, and 5Y.

Image forming apparatus 100 carries out the following image forming process. Paper P is conveyed from a paper feed cassette 1*a* of the paper feed unit 1 by a pickup roller 1*b* and a separation roller pair 1*e* (a roller pair on the left of the pickup roller 1*b* in FIG. 1) to the vertical conveying path 2 and conveyed via the registration roller pair 3 toward the secondary transfer unit 6.

In the image forming unit 50, toner images of respective colors of yellow, cyan, magenta, and black formed on photosensitive drums 51, each functioning as an image bearing member (the photosensitive drum 51 rotates counterclockwise in FIG. 1), are sequentially transferred, in an overlapped manner, on an intermediate transfer belt 11 of the intermediate transfer unit 4 (which will be described below) to form a color image.

This color image formed on the intermediate transfer belt 11 is subjected to secondary transfer by the secondary transfer unit 6 from the intermediate transfer belt 11 onto the paper P conveyed from the paper feed cassette 1*a*. The color image is thus formed on the paper P.

After this, the paper P onto which the color image is transferred is separated from the intermediate transfer belt 11 and conveyed to the fixing unit 7. Then, the paper P is provided with the amount of heat necessary for the fixing at a nip portion formed through press contact between a fixing roller 7*a* and a pressure roller 7*b*, and further, the pressure is applied between the fixing roller 7*a* and the pressure roller 7*b*, so that a fixing processing on the color image is performed. After the fixing processing is performed by the fixing unit 7, the paper P passes through the discharge conveying path 8 and is discharged to the discharge tray 9. It should be noted that the fixing roller 7*a* has a built-in heater (not shown), and the heater is controlled so that a surface of the fixing roller 7*a* has a predetermined temperature necessary for the fixing.

As shown in FIG. 1, in accordance with various implementations, the intermediate transfer unit 4 comprises a driving roller 41, a driven roller 42, a tension roller 44, and the endless intermediate transfer belt 11 wound across these three rollers. An appropriate tension is applied to the intermediate transfer belt 11 by the tension roller 44. In this state, driving force is transmitted from a driving motor 41M to the driving roller 41 (refer to FIG. 3), and the drive of the intermediate transfer belt 11 is carried out so that a surface speed of an outer circumferences of the photosensitive drums 51 for the respective image fanning mechanisms 5B, 5M, 5C, and 5Y and a feeding speed of the intermediate transfer belt 11 become the same speed. An intermediate transfer cleaning unit 45 is provided with an intermediate transfer cleaning roller 45*a* and an intermediate transfer cleaning blade 45*b*. The intermediate transfer cleaning roller 45*a* is in press contact against the intermediate transfer belt 11 and moves in the same direction as a rotation direction of the intermediate transfer belt 11 in a contact part of the components. The intermediate transfer cleaning blade 45*b* scrapes off transfer residue toner on the intermediate transfer belt 11 by contacting with the intermediate transfer belt 11 on a downstream side of the position of the intermediate transfer cleaning roller 45*a* in the moving direction of the intermediate transfer belt 11.

Next, an illustrative configuration of the image forming unit 50 which is the main configuration element of the image forming apparatus 100 will be described in detail. The image forming unit 50 includes image forming mechanisms 5B, 5M, 5C, and 5Y, each including a respective developing apparatus 56. As depicted, according to some implementations, image forming mechanisms 5B, 5M, 5C, and 5Y are arranged side by side on a lower side of the intermediate transfer unit 4. For the arrangement of the respective image forming mechanisms, the image fainting mechanisms used for yellow (Y), cyan (C), magenta (M), and black (B) are arranged in an order from the moving direction upstream side of the intermediate transfer belt 11 and comprise image forming units having substantially the same configurations. Thus, as illustrated, in image forming mechanisms 5B, 5M, 5C, and 5Y, a part having the same or substantially the same configuration is assigned the same reference symbol. It should be noted that in the following description of the image forming mechanisms 5B, 5M, 5C, and 5Y, unless otherwise particularly specified, identification symbols "Y", "C", "M", and "B" are omitted and simply represented as image forming mechanism 5 for ease of reference and clarity of exposition.

Image forming mechanism 5 includes the photosensitive drum 51, a main charging apparatus 52, an exposure apparatus 53, a primary transfer member (primary transfer roller) 54, a cleaning apparatus 55, and the developing apparatus 56 and is formed into one unit by incorporating the photosensitive drum 51 and the like into a casing made of resin or the like, which is mounted to a main body of the image forming apparatus 100.

In various embodiments, an amorphous silicon drum is used for the photosensitive drum 51 and the photosensitive drum 51 is charged by the main charging apparatus 52 so that a dark potential (electrostatic potential) at the developing position has a predetermined potential. By irradiating the charged surface of the photosensitive drum 51 with light corresponding to image information by the exposure apparatus 53, an electrostatic latent image is formed on the surface of the photosensitive drum 51. It should be noted that according to some embodiments such as the present embodiment, LPH (LED print head) is used for the exposure apparatus 53. In various alternative embodiments, the exposure apparatus of one or more of the image forming mechanisms may be implemented with a different type of radiation source, such as an LSU (laser scanning unit). Also, the photosensitive drum 51 is rotated by a rotation drive mechanism (not shown), and a rotation speed thereof is controlled by the control unit 18 (refer to FIG. 3) such as a micro-computer (e.g., comprising one or more program-controlled microprocessors).

In the developing apparatus 56, toner particles supplied from a toner tank (not shown) are supplied to a surface of a developing roller 57 and then to the electrostatic latent image formed on the surface of the photosensitive drum 51 from the developing roller 57 to develop the electrostatic latent image formed on the surface of the photosensitive drum 51 and form the toner image.

By way of example only, illustrative settings that may be used are such that the dark potential of the photosensitive drum 51 is nominally about +300V, the developing bias is nominally about +200V, and a potential after exposure is nominally about +20V. A potential difference between the developing bias and the potential after exposure is generally referred to as a so-called contrast potential. For example, in the formation of a black toner image, the dark potential corresponds to a white part of the image, and the potential after exposure corresponds to a black part of the image. The toner image formed in the above-mentioned manner is transferred to a surface of the intermediate transfer belt 11 of the intermediate transfer unit 4 in a primary transfer nip with the primary transfer member 54. The primary transfer member 54 is a primary transfer roller. For performing the primary transfer of the toner image formed on the photosensitive drum 51 to the intermediate transfer belt 11, a primary transfer bias having a polarity opposite to a surface potential of the photosensitive drum 51 is applied on the primary transfer roller.

The toner which is not subjected to the primary transfer on the photosensitive drum 51 is removed by the cleaning apparatus 55. Subsequently, for lowering a residual potential on the surface of the photosensitive drum 51 and providing for uniformity of the potential, the charge on the photosensitive drum 51 is eliminated by a charge eliminating lamp 58 to prepare for the next series of processes. It should be noted that in various implementations the potential setting in the image formation can select optimal values based, at least in part, on one or more of a characteristic of the photosensitive drum 51, a characteristic of the toner, an environment, and the like. The image forming apparatus 100 develops the images corresponding to black, magenta, cyan, and yellow on the photosensitive drums 51 by the image forming mechanisms 5B, 5M, 5C, and 5Y to be sequentially transferred in an overlapped rammer onto the intermediate transfer belt 11 without misregistration for performing the formation of one color image.

In accordance with some embodiments, reflective photosensor 10 comprises photosensors 10*a* and 10*b* (FIG. 2) arranged facing both end parts in a width direction of the intermediate transfer belt 11 (main scanning direction) perpendicular to the moving direction of the intermediate transfer belt 11. Also, the reflective photosensors 10*a* and 10*b* function as registration sensors for detecting registration patches, which will be described below, formed by the image forming mechanisms 5B, 5M, 5C, and 5Y in areas of both the end parts of the intermediate transfer belt 11 in a width direction.

Figure 2:
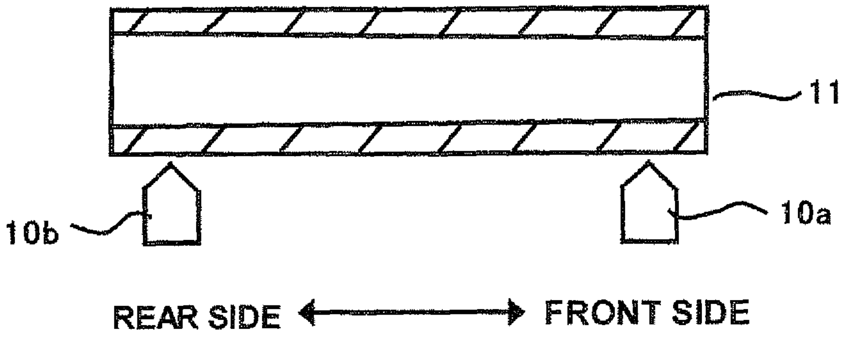
FIG. 2 shows an installation of a reflective photosensor in the image forming apparatus of FIG. 1 according to some embodiments of the present invention.

Herein, the arrangement of the reflective photosensors 10*a* and 10*b* according to some embodiments will be described. FIG. 2 is an explanatory diagram for describing the arrangement of the reflective photosensors 10*a* and 10*b*. The reflective photosensor 10*a* and the reflective photosensor 10*b* in this pair have a substantially similar configuration. As shown in FIG. 2, one reflective photosensor 10*a* is arranged on a front side of a main body unit 2, and the other reflective photosensor 10*b* is arranged on a rear side of the main body unit 2.

The reflective photosensors 10*a* and 10*b* in this pair are each provided with a light emitting unit comprising a light emitting diode for emitting light toward a position of the registration patches formed on the intermediate transfer belt 11, a light receiving unit comprising a photodiode for receiving reflected light which is reflected at the position of the registration patches formed on the intermediate transfer belt 11, and a detection circuit unit for converting the light amount of the reflected light received by the light receiving unit into a voltage value.

FIG. 3 is a block diagram showing an electrical configuration of the image forming apparatus 100 according to some embodiments such as the present embodiment. It should be noted that for case of reference and clarity of exposition, the same members as the respective members shown in FIG. 1 and FIG. 2 are assigned with the same reference numbers, and descriptions thereof are omitted.

As shown in FIG. 3, image forming apparatus 100 includes control unit 18 that performs transmission of various signals to the above-mentioned respective units of the image forming apparatus 100, reception of detected signals and the like from the respective units, and executes an overall operation control on the image forming apparatus 100, in accordance with some embodiments. Other than the image forming unit 50, the reflective photosensors 10*a* and 10*b*, the driving motor 41M, a storage unit 43, a pattern generator 71, an input operation unit 82, and a sensor unit 81 are also respectively connected to (e.g., communicably coupled by a direct or indirect communication link) the control unit 18. It should be noted that the input operation unit 82 functions as one function of a printer driver stored in an external device (not shown) (for example, a personal computer) which is connected to the image forming apparatus 100.

On the basis of a control signal from the control unit 18, driving motor 41M rotates the driving roller 41 to execute a transport operation of the intermediate transfer belt 11 at the time of the image forming operation onto the intermediate transfer belt 11.

Storage unit 43 is configured to temporarily store (save) image data of the respective colors sent from the external device (not shown) (for example, the personal computer). Also, the storage unit 43 has an interior temperature storage unit 431 and a table storage unit 432. On the basis of a detection signal of a temperature sensor 811, which will be described below, the interior temperature storage unit 431 stores an interior temperature detected by a temperature detection unit 62, which will be described below. On the basis of the detection signal of the temperature sensor 811, the table storage unit 432 stores a color misregistration amount which is set in accordance with a change amount of the interior temperature calculated by a temperature change detection unit 63 (which will be described below) in a table format. This color misregistration amount setting operation will be described in further detail below.

The pattern generator 71 is configured to store image data for forming the registration patches (color misregistration correction patches), which will be described below, on the surface of the intermediate transfer belt 11.

The sensor unit 81 includes, for example, the temperature sensor 811 for detecting a temperature of the surface or the surrounding of the photosensitive drum 51 as the above-mentioned interior temperature. The temperature sensor 811 detects the above-mentioned interior temperature and outputs a detection signal in accordance with the interior temperature to the control unit 18. The temperature sensor 811 and the temperature detection unit 62 of the control unit 18, which will be described below, comprise an interior temperature monitoring unit.

Also, as implemented according to some embodiments, sensor unit 81 includes an image density sensor 812 for detecting image density of the image transferred onto the intermediate transfer belt 11. The image density is calculated on the basis of a reflectance of the light illuminated onto the toner image. On the basis of an instruction from the control unit 18, the density sensor 812 irradiates the toner image with the light and outputs a light reception signal of the reflected light to the control unit 18 as the detection signal.

In accordance with some embodiments, control unit 18 is provided with a RAM (Random Access Memory) having a function of temporarily storing data and a functioning as a working area for one or more processes being executed, a flash memory comprising previously stored information including one or more programs (e.g., control programs) and associated data or parameters or the like, and a CPU (e.g., comprising one or more processors) for reading out the program(s) and the like from the flash memory and executing the program(s) and the like. The CPU, the RAM, and the flash memory may be configured to send and receive the data via a data bus. By appropriately executing the program stored in the flash memory, the CPU executes processing in accordance with a content of the program; that is, it functions as a program-controlled processor to execute control provided by control unit 18.

Incidentally, in the image forming apparatus 100 according to some embodiments such as the present embodiment, formation positions or expected formation positions of the toner images of the respective colors by the respective image forming mechanisms 5Y, 5C, 5M, and 5B are not mutually registered, and thus color misregistration may occur in which an image is formed having a color different from the target (e.g., intended) color. Also, a state may be established in which the color misregistration occurs if the image forming operation is performed (a state in which the color misregistration may occur). Therefore, the image fanning apparatus 100 according to some embodiments (such as the present embodiment) is provided with a function of suppressing the occurrence of the state in which the color misregistration occurs or the state in which the color misregistration may occur. It should be noted that in the following description, the state in which the color misregistration may occur is also represented, or otherwise referred to, as a state of the color misregistration.

For a method of correcting such color misregistration, up to now, the following method of correcting the color misregistration may be adopted in some cases. That is, the image fowling mechanisms 5Y, 5C, 5M, and 5B respectively form the registration patches (which will be described below) on the surface of the intermediate transfer belt 11. The positions of the registration patches are detected, and a position interval of the detected respective registration patches is measured as time. On the basis of the measurement result, a color misregistration amount is calculated, and the color misregistration is corrected on the basis of the calculated color misregistration amount.

On the other hand, causes of generating the color misregistration include deformation or the like of the respective units in the respective image forming mechanisms 5Y, 5C, 5M, and 5B which may be caused by heat generated in the respective image forming mechanisms 5Y, 5C, 5M, and 5B and the like during the printing operation. Therefore, color misregistration may occur during the printing operation in some cases.

During operating of image forming apparatus, a situation may occur wherein image data that should be subjected to monochrome printing and image data that should be subjected to color printing are mixed and set as the printing target of the image forming apparatus 100. According to presently known techniques, for such a printing target, in a case where the monochrome printing is performed at the current moment (e.g., at a time before color printing), it is not possible to instruct the image forming apparatus 100 to previously determine (e.g. determine in advance) the timing for which the image data that should be subjected to the color printing will become the printing target in the next turn (next image formation operation).

For that reason, up to now, by taking into account a case in which the printing target in the next turn may be image data that should be subjected to color printing, in a case where a necessity of performing the color misregistration correction due to the temperature change or the like occurs, the setting is made so as to perform the above-mentioned operation of correcting the color misregistration such that it is performed even in a case where it may not otherwise be necessary, such as during the mid-flow of carrying out the monochrome printing operation.

Although the above-mentioned correction method adopted as the color misregistration correction method may provide for high precision color misregistration correction, it requires a relatively long period of time associated with carrying out the processing of forming the registration patches, the processing of detecting the positions of the registration patches and measuring the position interval of the detected respective registration patches as the time, the processing of calculating the color misregistration amount on the basis of the measurement result, and the like are carried out.

For that reason, when the printing operation that should be carried out on a recording medium (such as paper) in the next turn is actually the monochrome printing operation, although there is not a situation in which the high precision color misregistration correction through the above-mentioned color misregistration correction method is demanded, the color misregistration correction processing is nevertheless carried out through the high precision color misregistration correction method, and it takes a relatively long period of wasted time until the unnecessary (in such a case) color misregistration correction processing is completed. As a result, although monochrome printing is being performed, the user is caused to wait for a relatively long time because of the color misregistration correction processing. For that reason, the user may be dissatisfied with the image forming apparatus 100.

Various embodiments of the present invention (such as the present embodiment) solve the above-mentioned problem (among others). For example, as further described below, control unit 18 according to the present embodiment executes control in accordance with and provides functions of an image density correction unit 61, temperature detection unit 62, temperature change detection unit 63, a determination unit 64, a mode setting unit 65, a detection color misregistration correction processing unit 66, and an estimation color misregistration correction processing unit 67.

Figure 4:
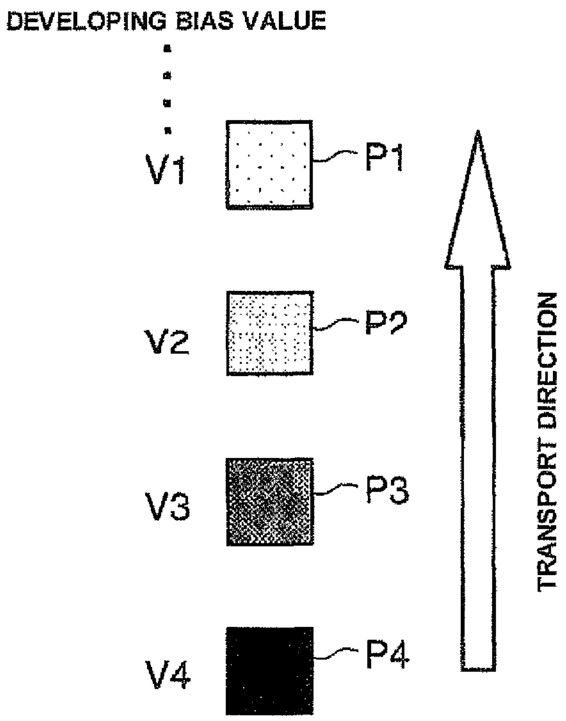
FIG. 4 shows examples of patches formed on a surface of an intermediate transfer belt at the time of a density correction processing according to some embodiments of the present invention.

In various implementations, image density correction unit 61 performs the following image density correction processing at, for example, the time of a preparation operation executed when the power supply of the image forming apparatus 100 is turned ON or a returning process from a power save mode (such as a sleep mode) or each time the number of prints reaches a predetermined number. That is, first, as shown in FIG. 4, the image density correction unit 61 forms patch images P1 to P4, each of which has a predetermined image density, on the surface of the intermediate transfer belt 11 with plural values of previously determined developing bias by respectively using the respective image forming mechanisms 5Y, 5C, 5M, and 5B. It should be noted that in FIG. 4, for clarity of exposition, only patch images formed by one image forming mechanism are illustrated as it will be understood that, for example, the same or similar patch images may be formed by the different image forming mechanisms.

Figure 5:
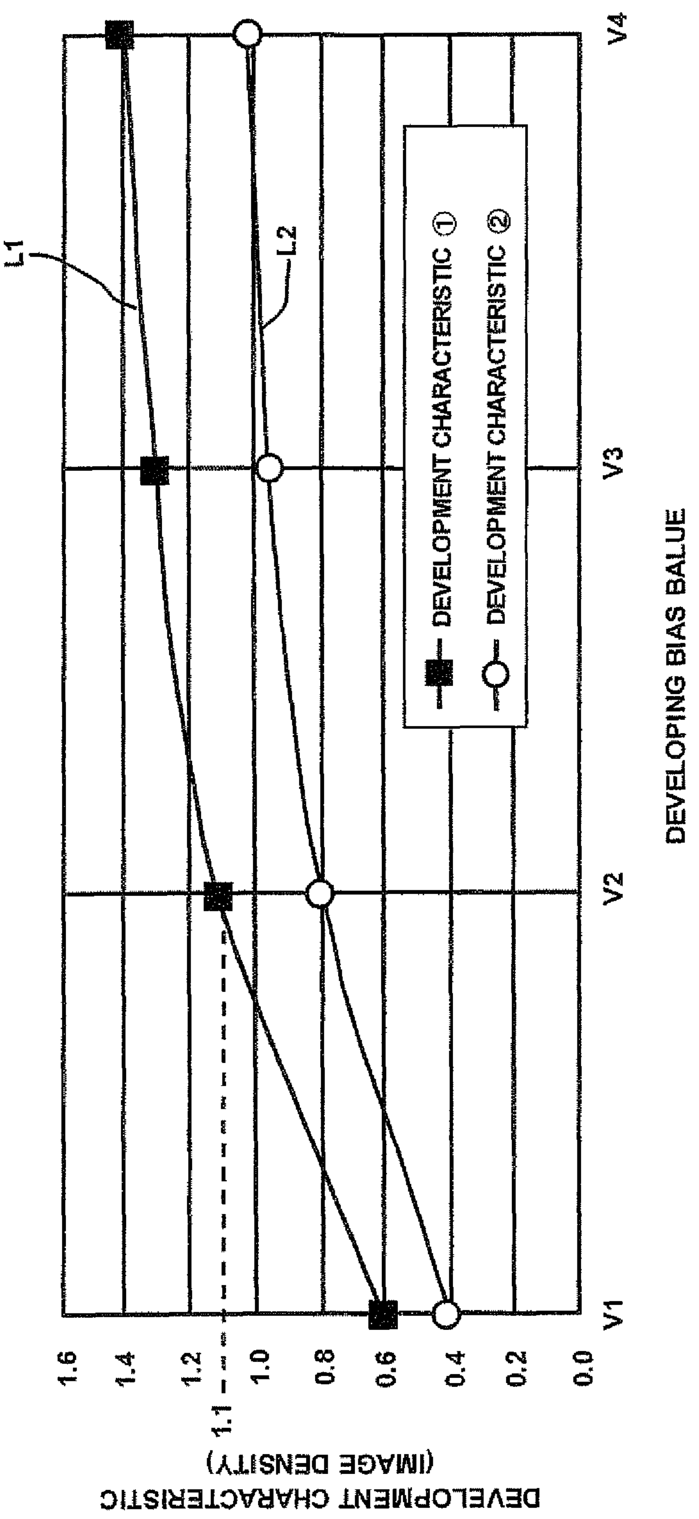
FIG. 5 shows illustrative graphs obtained by connecting points corresponding to combinations of respective developing bias values and respective image densities in coordinates where a horizontal axis represents the bias values and a vertical axis represents the image densities of the patches, in accordance with some embodiments of the present invention.

Next, the image density correction unit 61 causes the density sensor 812 to perform an image density measurement operation on the respective patch images P1 to P4, and detects the image densities of the respective patch images P1 to P4 on the basis of the detection signal output from the density sensor 812 (hereinafter, this detected image density will be referred to as detection value). FIG. 5 shows graphs L1 and L2 obtained by connecting points corresponding to combinations of the respective developing bias values and the respective detection values in coordinates where a horizontal axis represents the bias values and a vertical axis represents the image densities of the patch images. By way of example, the graphs L1 and L2 illustrate a case in which the charge state (development characteristic) of toner contained in the developing apparatus 56 is normal (the graph L1) and a case in which the charge state is high (the graph L2).

When the development characteristic illustrated in the graph L1 is compared with the development characteristic illustrated in the graph L2 in FIG. 5, even in a case where the images are formed at the same developing bias value, the development characteristic illustrated in the graph L1 has such a development characteristic that the image density is higher as compared with the development characteristic illustrated in the graph L2.

Storage unit 43 previously stores reference values of the image densities of the respective patch images. Reference values stored in storage unit 43 may, for example, be values for image densities detected previously for previously generated patch images during operation or during a calibration operation. Then, the image density correction unit 61 determines whether or not the respective detection values are matched with the reference values for each of the patch images P1 to P4. In a case where the detection values are not matched with the reference values, the image density correction unit 61 changes the developing bias values or the like so that the image densities of the patch images P1 to P4 are matched with the reference values.

The temperature detection unit 62 is configured to detect the interior temperature on the basis of the detection signal received from the temperature sensor 811. The temperature detection unit 62 accumulates (stores) the detected interior temperature in the storage unit 43.

The temperature change detection unit 63 calculates a difference between the current interior temperature detected by the temperature detection unit 62 and the interior temperature detected by the temperature detection unit 62 in a process of the last (previous) color misregistration correction processing (the previously detected interior temperature being stored in the interior temperature storage unit 431) as a temperature change amount.

The determination unit 64 compares the magnitude of the temperature change amount calculated by the temperature change detection unit 63 and a previously determined threshold ΔTth on the temperature change amount. In a case where the temperature change amount is equal to or higher than the threshold ΔTth, as it is supposed that the color misregistration occurs in the image forming unit 50, the determination unit 64 determines that the color misregistration correction operation needs to be carried out. On the other hand, in a case where the temperature change amount is lower than the threshold ΔTth, as it is supposed that such color misregistration that requires the color misregistration correction operation does not occur in the image forming unit 50, the determination unit 64 determines that the color misregistration correction operation does not need to be carried out.

Mode setting unit 65 is configured to set a color misregistration correction mode when the determination unit 64 determines that the color misregistration correction operation needs to be carried out. In image forming apparatus 100 according to some embodiments such as the present embodiment, the color misregistration correction modes include a detection color misregistration correction mode for causing detection color misregistration correction processing unit 66 (which will be described below) to perform the color misregistration correction processing, and an estimation color misregistration correction mode for causing estimation color misregistration correction processing unit 67 to perform the color misregistration correction processing.

Then, in accordance with various embodiments, mode setting unit 65 performs a setting of the color misregistration correction mode in the following manner. That is, in a case where the monochrome printing operation is currently performed, the mode setting unit 65 selects the estimation color misregistration correction mode as the color misregistration correction mode. That is, in a situation in which the monochrome printing operation is currently performed, when the difference (temperature change amount) between the current interior temperature and the interior temperature detected by the temperature detection unit 62 at the time of the last (previous) color misregistration correction processing is equal to or higher than the predetermined threshold ΔTth, the mode setting unit 65 selects the estimation color misregistration correction mode as the color misregistration correction mode.

On the other hand, in a case where the color printing operation is currently performed, the color misregistration operation should be performed in the detection color misregistration correction mode in which the high precision color misregistration correction can be performed. However, in a case where the color misregistration correction operation is performed in the detection color misregistration correction mode, the developing apparatus 56 carries out an aging operation for forming the registration patches. This aging operation may become a cause of accelerating the degradation of the toner.

That is, the developing apparatus 56 is driven for forming the registration patches, and at this time, the toner in the developing apparatus 56 is agitated. Thus, the charging amount of the toner is increased. However, the amount of toner consumed for forming the registration patches is minute, and therefore a large part of the toner with the increased charging amount remains in the developing apparatus 56 without being discharged out of the developing apparatus 56. If the operation of the detection color misregistration correction mode is repeatedly performed, the charging amount of the toner in the developing apparatus 56 is substantially increased, which leads to the degradation of the development property of the toner. Therefore, when the color misregistration correction operation is performed in the detection color misregistration correction mode, the degradation of the toner may advance.

According to various known misregistration correction techniques, in a case where the degradation of the toner has already advanced, if the further aging operation is executed, potentially, the toner themselves cannot be used for the image forming operations. Therefore, it is conceivable that the color misregistration correction operation in the detection color misregistration correction mode in which the degradation of the toner further advances should not be performed.

In view of the above, according to some embodiments such as the present embodiment, in a case where the color printing operation is currently performed, in accordance with the current degradation situation of the toner, the detection color misregistration correction mode or the estimation color misregistration correction mode is selected. That is, in a case where it is conceivable that the degradation of the toner has not advanced so much, the mode setting unit 65 selects the detection color misregistration correction mode as the color misregistration correction mode. On the other hand, in a case where it is conceivable that the degradation of the toner has advanced, the mode setting unit 65 selects the estimation color misregistration correction mode as the color misregistration correction mode.

The current degradation situation of the toner can be determined on the basis of the development characteristic (state of the toner) which is detected in the last image density correction processing. To be more specific, the mode setting unit 65 focuses on the detection value corresponding to the specific previously determined developing bias value among the respective values of the image densities of the respective patch images detected in the last image density correction processing and compares the magnitude of the detection value and a previously determined threshold ΔDth corresponding to the detection value.

Then, in a case where the detection value is equal to or higher than the threshold ΔDth, as it is conceivable that the toner is not charged so much, the mode setting unit 65 determines that the degradation of the toner has not advanced so much. On the other hand, in a case where the detection value is lower than the threshold ΔDth, as it is conceivable that the toner is relatively strongly charged, the mode setting unit 65 determines that the degradation of the toner has relatively advanced.

In accordance with some embodiments, by way of example, when the description is given by using FIG. 5, the mode setting unit 65 focuses on the detection value of the image density corresponding to a developing bias V2 (detection value of the image density corresponding to a point P1 or a point P2 in FIG. 5) among the detection values of the image densities of the patch images P1 to P4 detected in the last image density correction processing and determines the magnitude between the detection value and the predetermined threshold ΔDth (for example, "1.0").

In a case where the development characteristic illustrated in the graph L1 is obtained in the last image density correction processing, the detection value corresponding to the developing bias value V2 is "1.1", and the detection value "1.1" is higher than the threshold ΔDth "1.0". Therefore, in this case, as it is conceivable that the charging amount of the toner is relatively low and the degradation of the toner has not advanced so much, the mode setting unit 65 selects the detection color misregistration correction mode.

On the other hand, in a case where the development characteristic illustrated in the graph L2 is obtained in the last image density correction processing, the detection value corresponding to the developing bias value V2 is "0.8", and the detection value "0.8" is lower than the threshold ΔDth "1.0". Therefore, in this case, as it is conceivable that the charging amount of the toner is relatively high and the degradation of the toner has advanced, the mode setting unit 65 selects the estimation color misregistration correction mode.

When the mode setting unit 65 sets the detection color misregistration correction mode, the detection color misregistration correction processing unit 66 is configured to detect the color misregistration in a main scanning direction (the direction perpendicular to the transport direction of the intermediate transfer belt 11 or the direction perpendicular to the conveyance direction of the recording paper), the color misregistration in the sub scanning direction (the same direction as the transport direction of the intermediate transfer belt 11 or the same direction as the conveyance direction of the recording paper), and the color misregistration in an oblique direction (the direction between the main scanning direction and the sub scanning direction), and execute the color misregistration correction (registration correction) on the basis of the detection.

The color misregistration in the main scanning direction typically may be caused by an installment error of an exposure apparatus 53 composed of the LED print head or the like. The color misregistration in the sub scanning direction typically may be caused by an installment error of the image forming mechanisms 5Y, 5C, 5M, and 5B, a rotation speed error of a drive motor for rotating the respective photosensitive drums 51, or the like. The color misregistration in the oblique direction typically may be caused by an installment error (inclination) of the image forming mechanisms 5Y, 5C, 5M, and 5B, a skew of the intermediate transfer belt 11, or the like.

Figure 6:
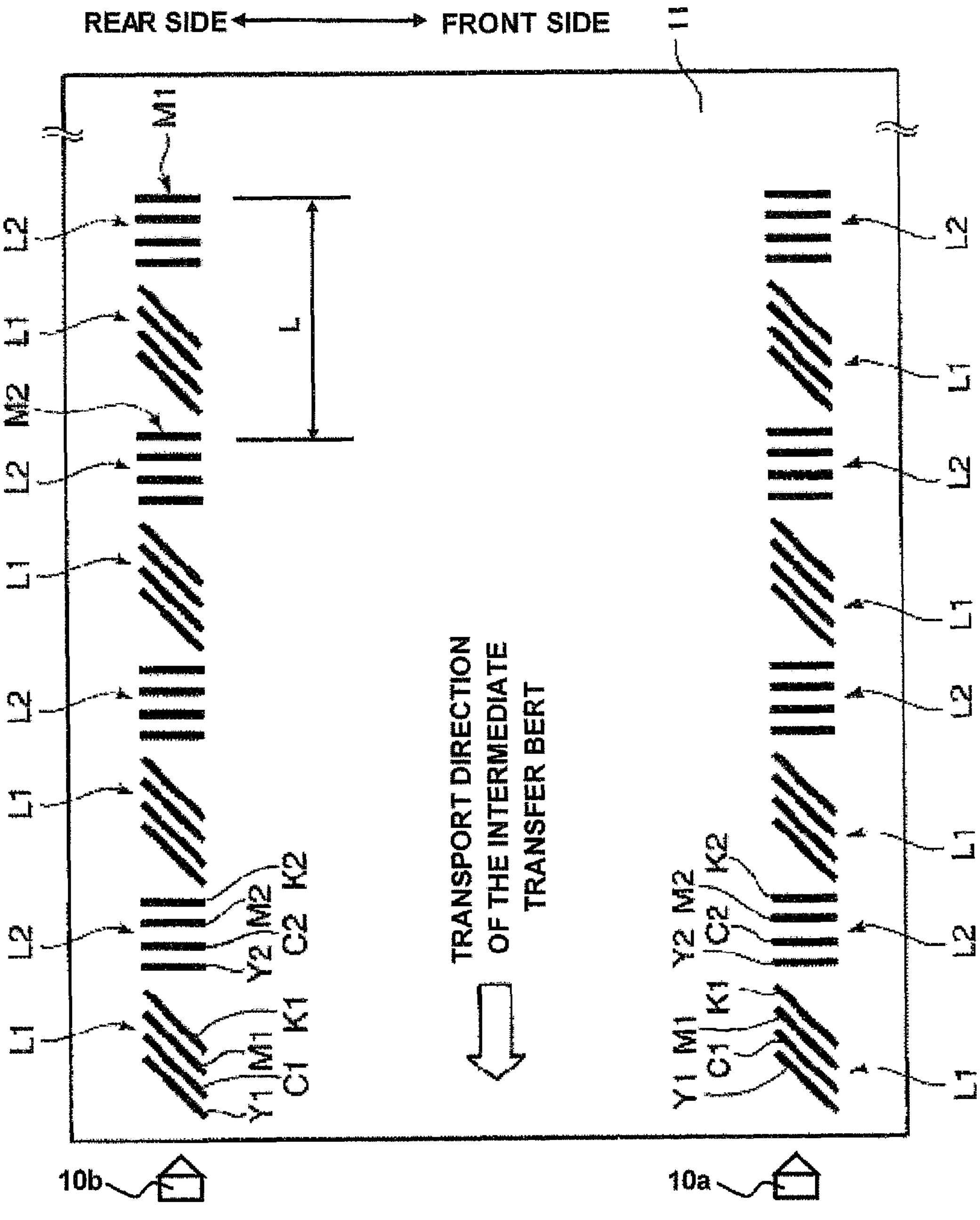
FIG. 6 shows illustrative patches for color misregistration processing formed on an intermediate belt according to some embodiments of the present invention.

On the basis of the output signal from the pattern generator 71, the detection color misregistration correction processing unit 66 forms the registration patches which may be formed of a combination of linear patterns of four colors for detecting the color misregistration by operating the image forming mechanisms 5Y, 5C, 5M, and 5B. FIG. 6 shows examples of the registration patches formed on the intermediate transfer belt 11.

As shown in FIG. 6, in accordance with some embodiments, the registration patches are obtained by alternately forming a diagonal line part L1 composed of linear patterns of four colors having a predetermined width and a horizontal line part L2 composed of linear patterns of four colors having a predetermined width on an upstream side of the diagonal line part L1 in the transport direction of the intermediate transfer belt 11 (right side of the drawing) at predetermined intervals. Such registration patches are formed in both end parts in the width direction of the intermediate transfer belt 11 (the main scanning direction).

The diagonal line part L1 is obtained by forming a linear pattern Y1 which is a yellow toner image formed by the image forming mechanism 5Y, a linear pattern C1 which is a cyan toner image formed by the image forming mechanism 5C, a linear pattern M1 which is a magenta toner image formed by the image forming mechanism 5M, and a linear pattern K1 which is a black toner image formed by the image forming mechanism 5B in the stated order respectively at a degree of 45° with respect to the sub scanning direction (or the main scanning direction) at predetermined intervals from a downstream side of the transport direction of the intermediate transfer belt 11 (lift side of the drawing) to the upstream side (right side of the drawing).

Similarly, as in the diagonal line part L1, the horizontal line part L2 is obtained by forming a line Y2 which is a yellow toner image formed by the image forming mechanism 5Y, a line C2 which is a cyan toner image formed by the image forming mechanism 5C, a line M2 which is a magenta toner image formed by the image forming mechanism 5M, a line K2 which is a black toner image formed by the image forming mechanism 5B in the stated order respectively along the sub scanning direction (the transport direction of the intermediate transfer belt 11) at predetermined intervals from the downstream side of the transport direction of the intermediate transfer belt 11 (lift side of the drawing) to the upstream side (right side of the drawing).

It should be noted that among the pair of the reflective photosensors 10*a* and 10*b*, one reflective photosensor 10*a* is arranged at a position where it is possible to detect approximately the center positions in the main scanning direction of the diagonal line part L1 and the horizontal line part L2 of the registration marks in one end part, and the other reflective photosensor 10*b* is arranged at a position where it is possible to detect approximately the center positions in the main scanning direction of the diagonal line part L1 and the horizontal line part L2 of the registration marks in the other end part.

Detection color misregistration correction processing unit 66 controls the measurement operation on the registration patches by the pair of the reflective photosensors 10*a* and 10*b*. Detection color misregistration correction processing unit 66 obtains, for example, the outputs from the reflective photosensors 10a and 10b after a count start instruction is performed as a falling edge of a synchronization signal is detected, from a time reaching a measurement start timing (e.g., in terms of milliseconds, ms), obtained on the basis of a distance (e.g., in terms of millimeters, mm) from an exposure position with respect to the photosensitive drum 51 of the image forming mechanism 5M to the detection positions for the registration patches by the reflective photosensors 10a and 10b and a circumferential speed of the intermediate transfer belt 11 (minis), to a time until the four pairs of the diagonal line parts L1 and the horizontal line parts L2 finish passing through the detection positions of the reflective photosensors 10a and 10b.

The detection color misregistration correction processing unit 66 calculates a correction amount with respect to the color misregistration of the respective linear patterns (position misregistration) that may be employed in accordance with some embodiments. That is, with regard to the color misregistration of the respective linear patterns, by detecting the positions of the respective lines Y2, C2, M2, and K2 of the horizontal line part L2 on both opposing left and right sides, the color misregistration amount in the oblique direction (inclination direction) can be detected. By detecting an interval in the sub scanning direction between the respective lines Y2, C2, M2, and K2 of the horizontal line part L2 on both the opposing left and right sides, the color misregistration amount in the sub scanning direction can be detected. By detecting an interval between the respective linear patterns Y1, C1, M1, and K1 of the diagonal line part L1 and the respective lines Y2, C2, M2, and K2 of the horizontal line part L2 mutually having the same color in at least one pair on both the opposing left and right sides, the color misregistration amount in the main scanning direction can be detected. From these detected color misregistration amounts (e.g., the number of lines or the number of pixels), the color misregistration correction amount (e.g., the number of lines or the number of pixels) is obtained.

Then, the detection color misregistration correction processing unit 66 performs the color misregistration correction for the respective colors on the basis of the calculated color misregistration correction amounts. It should be noted that for the specific color misregistration correction method based on the calculated color misregistration correction amount, it is possible to adopt various methods, such as a method described in Japanese Unexamined Patent Application Publication No. 2006-201624 filed by the applicant of the present application, but for clarity of exposition a specific description thereof will be omitted herein.

Figure 7:
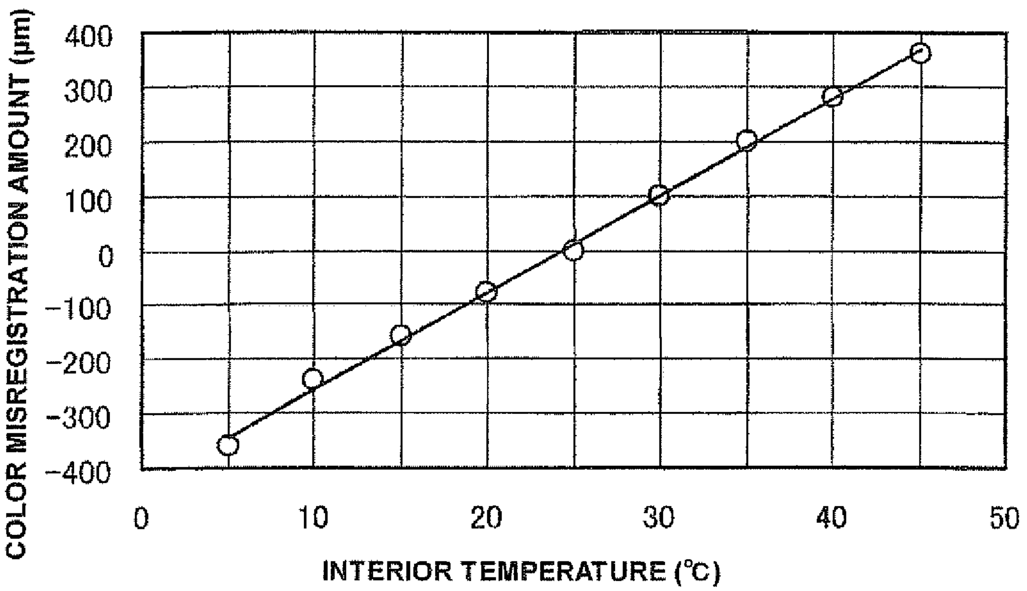
FIG. 7 shows an illustrative table in which a corresponding relation between an internal temperature and a color misregistration amount is defined according to some embodiments of the present invention.

When the mode setting unit 65 sets the estimation color misregistration correction mode, the estimation color misregistration correction processing unit 67 derives the color misregistration amount estimated to occur at the current moment on the basis of the temperature change amount of the interior temperature of the image forming unit 50 (which will be described below) and performs an estimation color misregistration correction processing on the basis of the color misregistration amount. FIG. 7 shows a graph depicting an illustrative relation between the interior temperature of the image forming unit 50 and the color misregistration amount.

As shown in FIG. 7, a correlative relation exists between the interior temperature that can be detected by the temperature sensor 811 and the temperature detection unit 62 and the color misregistration amount. As described above, the table storage unit 432 stores the correspondence relation illustrated in FIG. 7 between the interior temperature and the color misregistration amount in a table format in advance. In accordance with various implementations, the correspondence relation may be determined through a calibration procedure or other similar testing operations conducted in advance and/or may be determined (and/or updated) during normal operation of the image forming apparatus (e.g. in the detection color misregistration correction mode).

When the temperature detection unit 62 detects the interior temperature, the estimation color misregistration correction processing unit 67 derives the color misregistration amount corresponding to the interior temperature by using the table stored in the table storage unit 432. Also, the estimation color misregistration correction processing unit 67 derives the color misregistration amount corresponding to the interior temperature stored in the interior temperature storage unit 431 of the storage unit 43 detected at the time of the last (previous) color misregistration correction processing by using the table stored in the table storage unit 432. Then, the estimation color misregistration correction processing unit 67 calculates a mutual difference of these color misregistration amounts as the currently caused color misregistration amount.

For example, it is supposed the current interior temperature detected by the temperature detection unit 62 is 35 (° C.), and the interior temperature stored in the interior temperature storage unit 431 of the storage unit 43 detected at the time of the last (previous) color misregistration correction processing is 30 (° C.). In this case, with reference to FIG. 7, the color misregistration amount when the interior temperature is 35 (° C.) is +200 (μm), and the color misregistration amount when the interior temperature is 30 (° C.) is +100 (μm). Therefore, the estimation color misregistration correction processing unit 67 derives 200−100=100 (μm) as the currently occurring color misregistration amount.

Then, the estimation color misregistration correction processing unit 67 performs the color misregistration correction processing on the basis of the thus obtained color misregistration amount, for example, while following the color misregistration correction method described in Japanese Unexamined Patent Application Publication No. 2006-201624 described above.

Comparing the detection color misregistration correction processing by the detection color misregistration correction processing unit 66 with the estimation color misregistration correction processing by the estimation color misregistration correction processing unit 67, the former detection color misregistration correction processing involves detecting a color misregistration amount based on forming registration patches, whereas the latter estimation color misregistration correction processing uses the previously determined color misregistration amount. For that reason, the latter estimation color misregistration correction processing can perform the color misregistration correction using a shorter period of time than the former detection color misregistration correction processing. On the other hand, the former detection color misregistration correction processing can perform the color misregistration correction at a higher accuracy than the latter estimation color misregistration correction processing.

Figure 8:
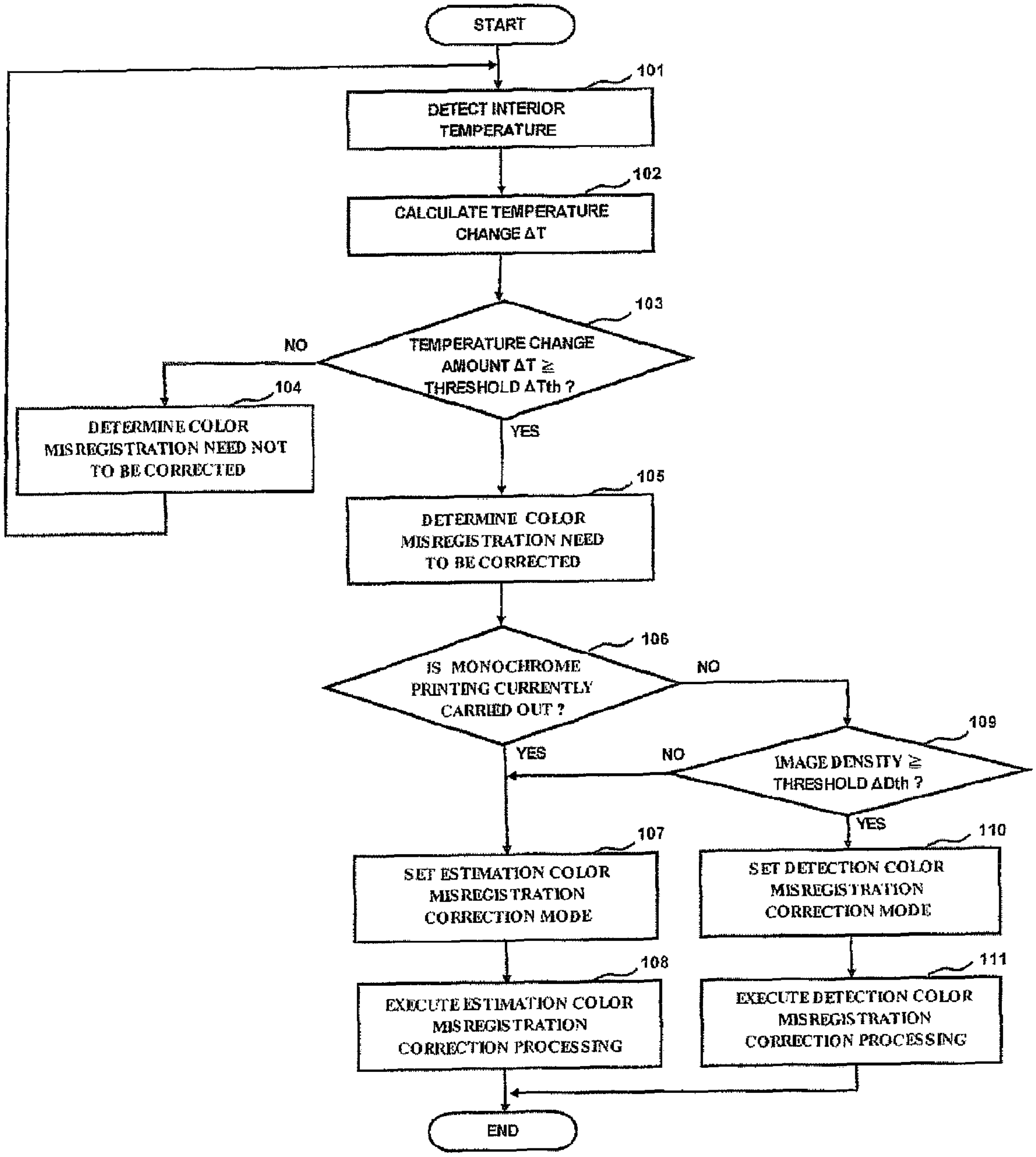
FIG. 8 is a flow chart showing illustrative processing related to color misregistration correction by a control unit in the image forming apparatus according to some embodiments of the present invention.

FIG. 8 is a flow chart showing a processing related to the color misregistration correction by the control unit 18, in accordance with some embodiments of the present invention.

As shown in FIG. 8, when the temperature detection unit 62 receives the detection signal from the temperature sensor 811, the temperature detection unit 62 detects the current interior temperature of the image forming unit 50 on the basis of the detection signal (block 101). Next, the temperature change detection unit 63 calculates a difference between the current interior temperature detected by the temperature detection unit 62 and the interior temperature detected at the time of the last (previous) color misregistration correction which is stored in the interior temperature storage unit 431 as a temperature change amount ΔT (block 102).

Then, the determination unit 64 compares the magnitude of the temperature change amount ΔT calculated by the temperature change detection unit 63 and the previously determined threshold ΔTth on the temperature change amount (block 103). In a case where the temperature change amount ΔT is lower than the threshold ΔTth (NO in block 103), as it is supposed that such color misregistration that requires the color misregistration correction does not occur in the image forming unit 50, the determination unit 64 determines that the color misregistration correction operation does not need to be carried out (block 104). The control unit 18 returns to the processing in block 101. On the other hand, in a case where the temperature change amount ΔT is equal to or higher than the threshold ΔTth (YES in block 103), as it is supposed that such color misregistration that requires the color misregistration correction occurs in the image forming unit 50, the determination unit 64 determines that the color misregistration needs to be corrected (block 105).

After the processing in block 105, the mode setting unit 65 determines whether or not the monochrome printing operation is currently carried out (block 106). In a case where the monochrome printing operation is currently carried out (YES in block 106), the estimation color misregistration correction mode is set as the mode for correcting the color misregistration (block 107). In response to this, the estimation color misregistration correction processing unit 67 executes the estimation color misregistration correction processing (block 108).

On the other hand, in a case where it is determined that the color printing operation is currently carried out (No in block 106), the mode setting unit 65 compares the magnitude of the image density (detection value) of the patch image corresponding to the specific previously determined developing bias value which is detected in the last image density correction processing and the predetermined threshold ΔDth (block 109). In a case where the detection value is lower than the threshold ΔDth (block 109: NO), the mode setting unit 65 sets the estimation color misregistration correction mode as the mode for correcting the color misregistration (block 107). The estimation color misregistration correction processing unit 67 executes the estimation color misregistration correction processing (block 108).

On the other hand, in a case where it is determined that the detection value is equal to or higher than the threshold ΔDth (block 109: YES), the mode setting unit 65 sets the detection color misregistration correction mode as the mode for correcting the color misregistration (block 110). The detection color misregistration correction processing unit 66 executes the detection color misregistration correction processing (block 111).

It should be noted that in a case where the image formation is not performed at the time of the interior temperature detection, a processing similar to the processing in a case where the color printing is performed at the time of the interior temperature detection is performed (block 106: NO).

As described above, according to some embodiments such as the present embodiment, in a case where the temperature change exceeding or equal to the threshold ΔTth is caused during the monochrome printing operation, the color misregistration is corrected through the estimation color misregistration correction processing. As a result, while a certain color misregistration correction accuracy is secured, as compared with the case of setting the detection color misregistration correction mode as the mode related to the color misregistration correction of the image forming apparatus 100, it is possible to carry out the color misregistration correction in a shorter period of time. Furthermore, as compared with the detection color misregistration correction mode, because the formation of the color misregistration correction patches is not performed, the reduction of the toner consumption amount can be accordingly realized.

Also, in a case where the temperature change exceeding or equal to the threshold ΔTth is caused during the color printing operation, when the image density (detection value) at the time of the last image density correction processing is equal to or higher than the threshold ΔDth and it is possible to determine that the degradation of the toner has not advanced so much, the detection color misregistration correction mode is set as the mode related to the color misregistration correction of the image forming apparatus 100, and therefore the high precision color misregistration correction can be performed.

On the other hand, when the image density at the time of the last image density correction processing is lower than the threshold ΔDth and it is possible to determine that the degradation of the toner has relatively advanced, the estimation color misregistration correction mode is set as the mode related to the color misregistration correction of the image forming apparatus 100. Therefore, a certain accuracy of the color misregistration correction is secured, and it is possible to avoid further degradation of the toner by carrying out the color misregistration correction processing in the detection color misregistration correction mode.

Then, in accordance with some embodiments, the image forming apparatus 100 is provided with mode setting unit 65 that sets, in a case where the temperature change equal to or exceeding the threshold ΔTth is caused during the color printing operation, when the image density at the time of the last image density correction processing is equal to or higher than the threshold ΔDth, the detection color misregistration correction mode as the mode related to the color misregistration correction of the image forming apparatus 100, and when the image density at the time of the last image density correction processing is lower than the threshold ΔDth, the estimation color misregistration correction mode as the mode related to the color misregistration correction of the image forming apparatus 100. Therefore, while a possibility of causing the further degradation of the toner is suppressed, it is possible to automatically set the mode related to the color misregistration correction of the image forming apparatus 100.

It should be noted that according to some illustrative embodiments, instead of the above-described illustrative embodiment or in addition to the above-described illustrative embodiment, the following modified mode may be implemented.

According to the above-described illustrative embodiment, when the temperature change of the interior temperature is equal to or higher than the predetermined threshold ΔTth during the conduction of the color printing operation, in accordance with the development characteristic of the toner in the process of the last image density correction processing, the control unit 18 of the image forming apparatus 100 (the mode setting unit 65) sets the mode of correcting the color misregistration by selecting between the detection color misregistration correction mode and the estimation color misregistration correction mode (e.g., automatically set on the apparatus side). But, in accordance with various embodiments, the configuration may not be limited in this manner (e.g., automatic setting on the apparatus side, without user input); that is, in accordance with various embodiments, a user may select the mode and/or provide input that may be used (e.g., the mode setting unit 65) in determining what mode should be set under various conditions.

Figure 9:
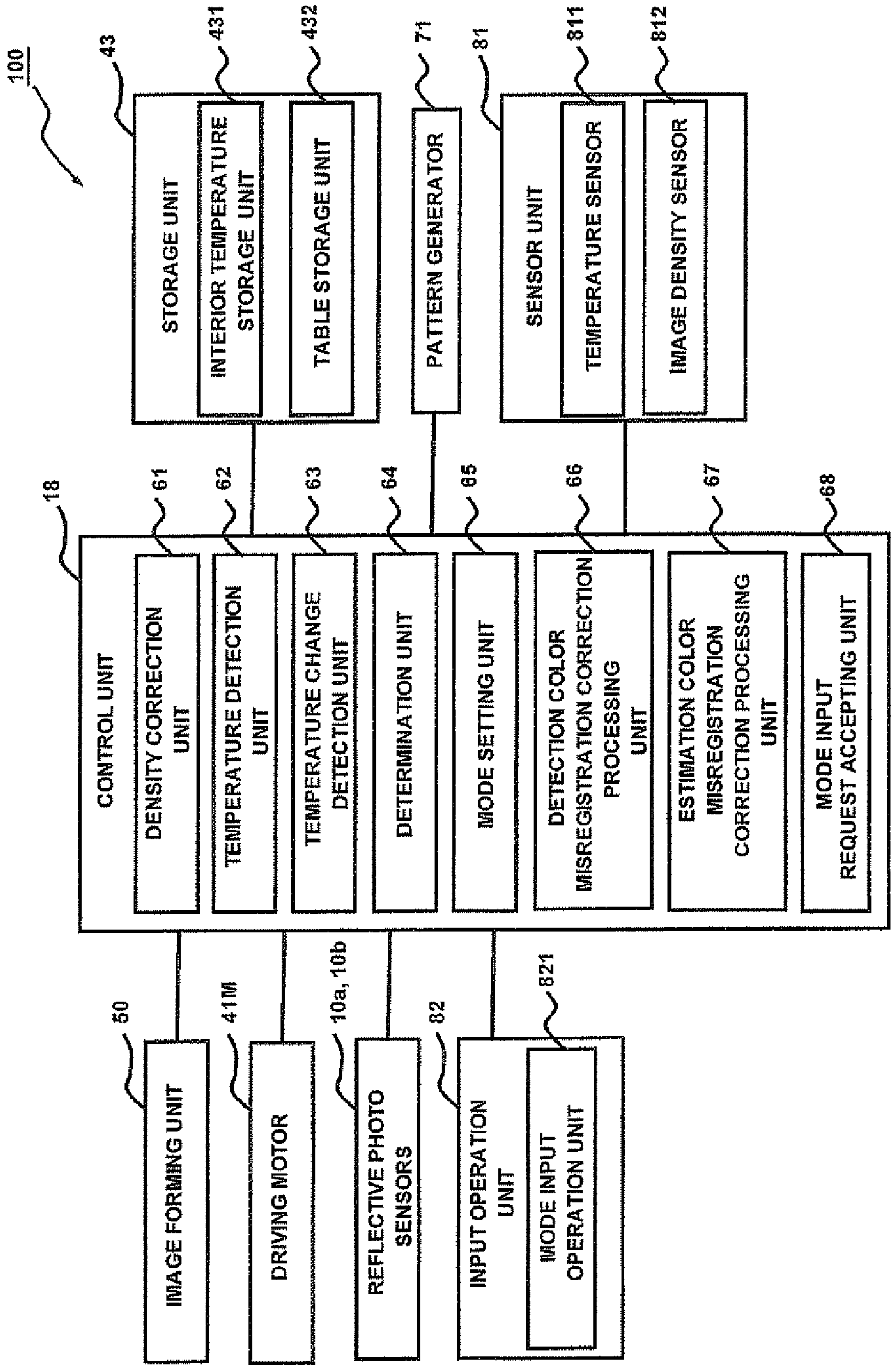
FIG. 9 is a block diagram of an electrical configuration of an image forming apparatus according to additional or alternative embodiments of the present invention.

FIG. 9 is a block diagram showing an electrical configuration of the image fanning apparatus 100 according to an illustrative embodiment that includes user input. It should be noted that the same members as the respective members shown in FIG. 1 and FIG. 3 are assigned with the same numbers, and a description thereof is omitted.

As shown in FIG. 9, image forming apparatus 100 according to various such embodiments may differ from the image forming apparatus 100 according to the first embodiment in that the control unit 18 is provided with a mode input request accepting unit 68, and also the input operation unit 82 is provided with a mode input operation unit 821.

Figure 10:
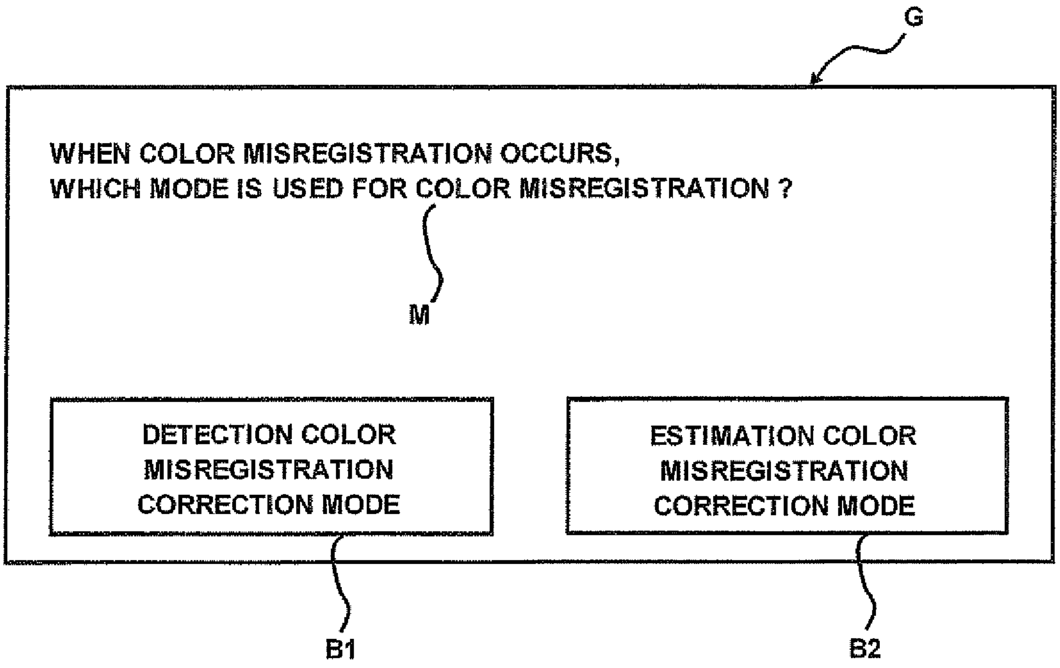
FIG. 10 shows an example of a mode input screen according to additional or alternative embodiments of the present invention.

When a predetermined operation is performed by the input operation unit 82, such as that shown in FIG. 10, the mode input request accepting unit 68 displays a mode input screen on a screen of a monitor which is connected to an external device which is connected to the image forming apparatus 100. The mode input screen G has a message M for asking whether the color misregistration correction operation is to be performed through processing according to the detection color misregistration correction mode or the estimation color misregistration correction mode in a case where color misregistration that needs to be subjected to the color misregistration correction occurs, a button B1 for performing an input (user input) for selecting the detection color misregistration correction mode with respect to the message M, and a button B2 for performing an input (user input) for selecting the estimation color misregistration correction mode with respect to the message M. An example of the message M is that "when color misregistration occurs, which mode is used for color misregistration?"

The mode input operation unit 821 comprises the buttons B1 and B2, and when the operation is performed on the button B1 or the button B2, the mode input request accepting unit 68 accepts the operation information (information indicating the selected color misregistration correction mode) from the mode input operation unit 821 and outputs the relevant information to the mode setting unit 65. The mode setting unit 65 stores the information.

Also, in the image forming apparatus 100 according to the present embodiment, compared with the image forming apparatus 100 according to the above-described embodiment (e.g., with reference to FIGS. 1-8), in a case where the color printing operation is performed, the mode setting processing by the mode setting unit 65 in a case where the determination unit 64 determines that the color misregistration correction operation needs to be carried out is different from the above-described embodiment.

That is, in a case where the color printing operation is performed, when the determination unit 64 determines that the color misregistration correction operation needs to be carried out, the mode setting unit 65 sets the color misregistration correction mode corresponding to the button operated on the mode input screen G as the color misregistration correction mode of the image forming apparatus 100.

To be more specific, when the button B1 is operated on the mode input screen G, the mode setting unit 65 sets the detection color misregistration correction mode as the color misregistration correction mode of the image forming apparatus 100, and on the other hand, when the button B2 is operated, the mode setting unit 65 sets the estimation color misregistration correction mode as the color misregistration correction mode of the image forming apparatus 100.

Figure 11:
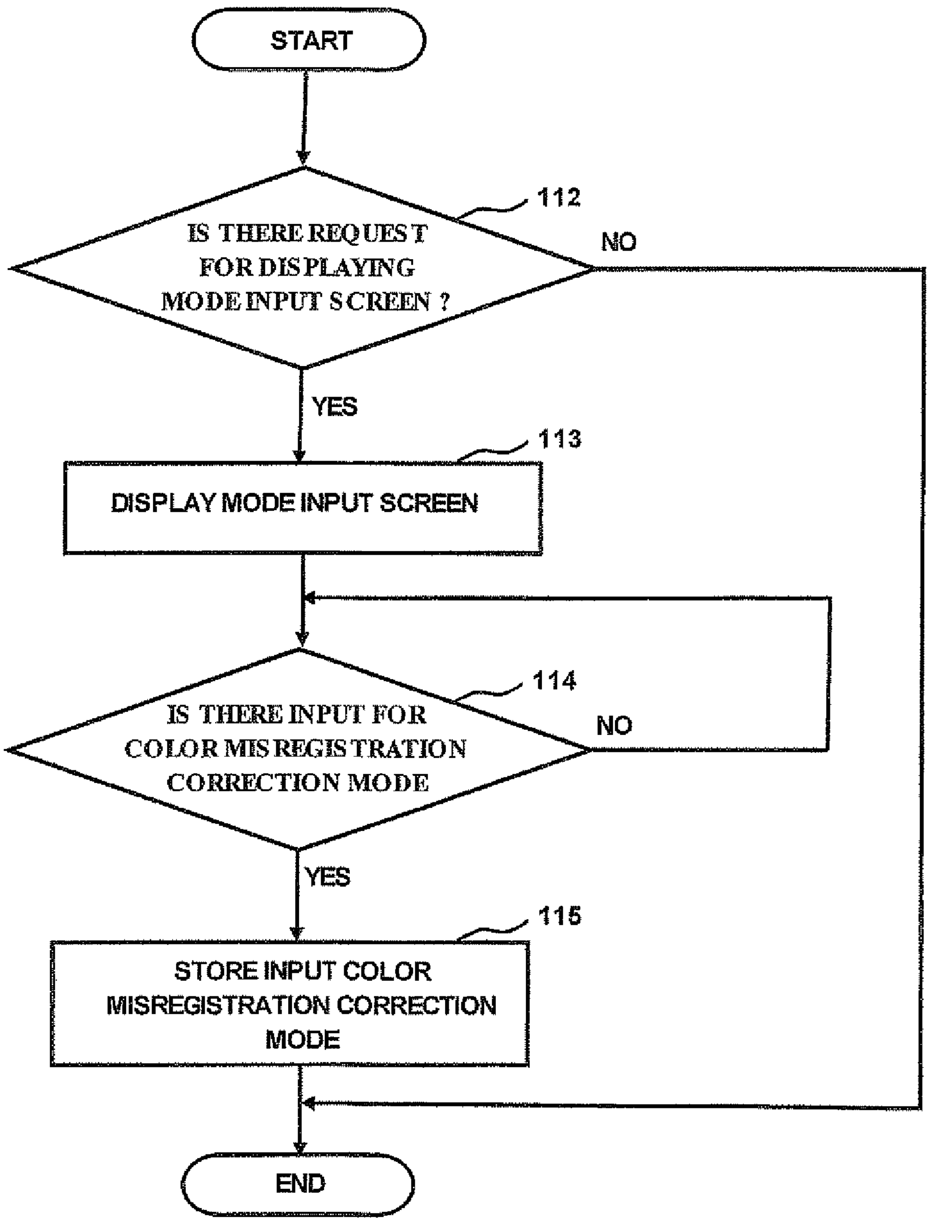
FIG. 11 is a flow chart showing illustrative processing related to a setting for the color misregistration correction according to additional or alternative embodiments of the present invention.

FIG. 11 is a flow chart showing the processing related to the color misregistration correction by the control unit 18 according to some embodiments such as the present embodiment.

As shown in FIG. 11, when a predetermined operation is performed by the input operation unit 82, in other words, when there is a request for displaying the mode input screen G (YES in block 112), the mode input request accepting unit 68 displays the mode input screen G shown in FIG. 10 on the display unit (block 113). Then, when the input for selecting the color misregistration correction mode exists (YES in block 114), the mode input request accepting unit 68 outputs the operation information (information indicating the selected color misregistration correction mode) to the mode setting unit 65, and the mode setting unit 65 stores the information (block 115).

Figure 12:
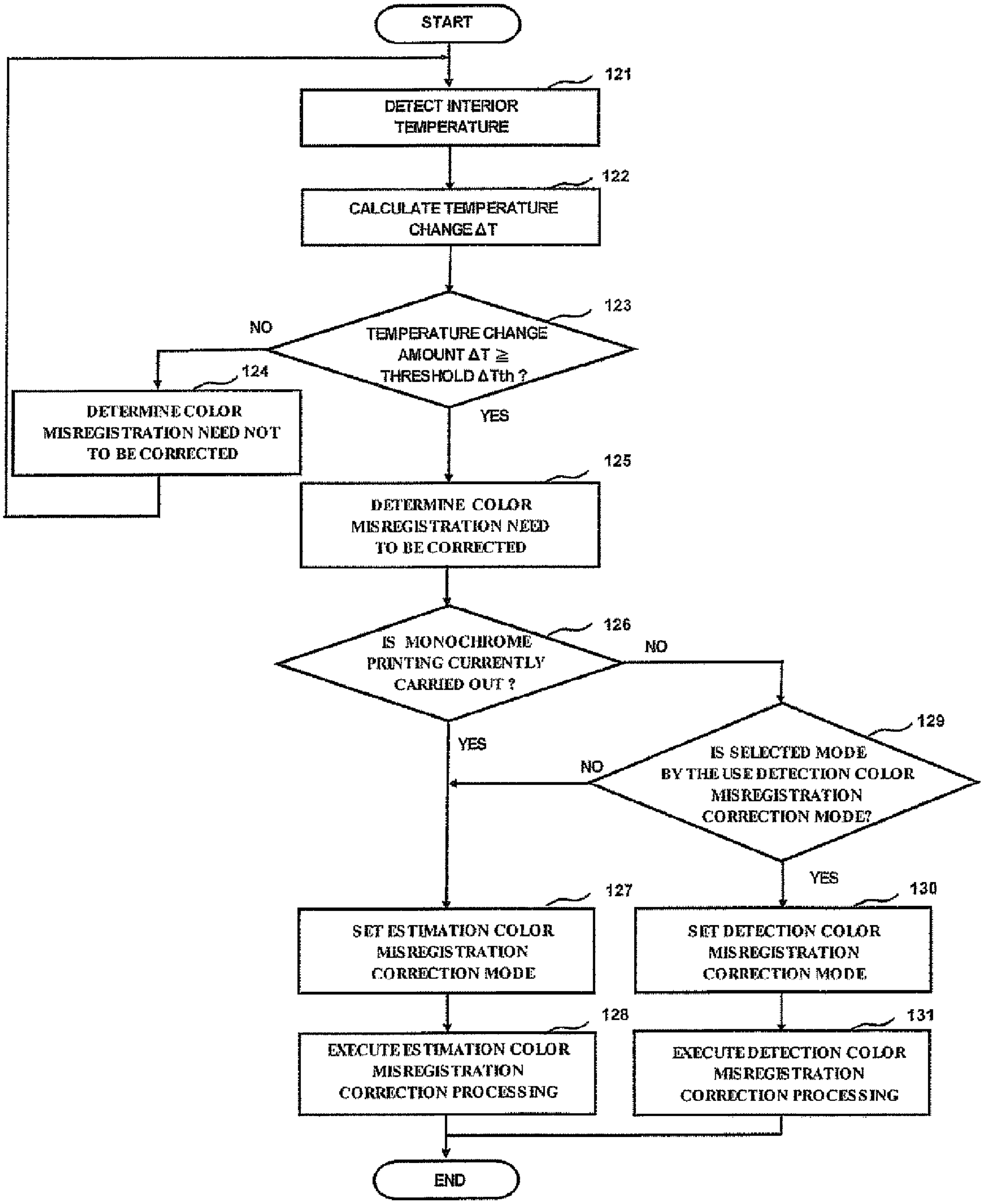
FIG. 12 is a flow chart showing illustrative processing related to the color misregistration correction by a control unit in the image forming apparatus according to additional or alternative embodiments of the present invention.

FIG. 12 is a flow chart showing the processing related to the color misregistration correction by the control unit 18.

As shown in FIG. 12, when the temperature detection unit 62 receives the detection signal from the temperature sensor 811, the temperature detection unit 62 detects the current interior temperature of the image forming unit 100 on the basis of the detection signal (block 121). Next, the temperature change detection unit 63 calculates a difference between the current interior temperature detected by the temperature detection unit 62 and the interior temperature detected at the time of the last (previous) color misregistration correction which is stored in the interior temperature storage unit 431 as a temperature change amount ΔT (block 122).

Then, the determination unit 64 compares the magnitude of the temperature change amount ΔT calculated by the temperature change detection unit 63 and the previously determined threshold ΔTth on the temperature change amount (block 123). In a case where the temperature change amount ΔT is lower than the threshold ΔTth (No in block 123), as it is supposed that such color misregistration that requires the color misregistration correction does not occur in the image forming unit 50, it is determined that the color misregistration correction operation does not need to be carried out (block 124), and the control unit 18 returns to the processing in block 121. On the other hand, in a case where the temperature change amount ΔT is equal to or higher than the threshold ΔTth (block 123: YES), as it is supposed that such color misregistration that requires the color misregistration correction occurs in the image forming unit 50, the determination unit 64 determines that the color misregistration needs to be corrected (block 125).

After the processing in block 125, the mode setting unit 65 determines whether or not the monochrome printing processing is currently carried out (block 126). In a case where the monochrome printing processing is currently carried out (Yes in block 126), the mode setting unit 65 sets the estimation color misregistration correction mode as the mode for correcting the color misregistration (block 127). In response to this, the estimation color misregistration correction processing unit 67 executes the estimation color misregistration correction processing (block 128).

On the other hand, in a case where it is determined that the color printing operation is currently carried out (No in block 126), the mode setting unit 65 determines whether or not the color misregistration correction mode selected by the user on the mode input screen G (see FIG. 10) is the detection color misregistration correction mode (the type of the color misregistration correction mode stored in block 115 is checked; block 129).

In a case where it is determined that the color misregistration correction mode selected on the mode input screen G (see FIG. 10) is not the detection color misregistration correction mode (No in block 129), the mode setting unit 65 sets the estimation color misregistration correction mode as the mode for correcting the color misregistration (block 127), and the estimation color misregistration correction processing unit 67 executes the estimation color misregistration correction processing (block 128).

On the other hand, in a case where it is determined that the color misregistration correction mode selected by the user on the mode input screen G is the detection color misregistration correction mode (YES in block 129), the mode setting unit 65 sets the detection color misregistration correction mode as the mode for correcting the color misregistration (block 130), and the detection color misregistration correction processing unit 66 executes the detection color misregistration correction processing (block 131).

It should be noted that in a case where the image formation is not performed at the time of the interior temperature detection, a processing similar to the processing in a case where the color printing is performed at the time of the interior temperature detection is performed (no in block 126).

As described above, according to the present embodiment, it is possible to realize the configuration for the user to manually set the color misregistration correction mode in a case where the temperature change of the interior temperature is equal to or higher than the predetermined threshold ΔTth during the conduction of the color printing operation in such a manner that in a case where a significance is placed on the color misregistration correction accuracy, the detection color misregistration correction mode is selected, and in a case where a significance is placed on shortening of the time required for the color misregistration correction operation, the estimation color misregistration correction mode is selected.

During the period of the printing preparation processing executed after the power supply of the image forming apparatus 100 is turned ON, even when the change amount of the interior temperature exceeds the threshold ΔTth, while the configuration is adopted in which the detection color misregistration correction processing or the estimation color misregistration correction processing is not carried out, it is possible to prevent the wasteful toner consumption and the degradation of the toner caused by the drive of the developing apparatus 56.

Also, in a case where a predetermined operation is performed on the image forming apparatus 100, for example, the operation unit, a ease where the image forming apparatus 100 is not used for a predetermined period of time, or the like, when the power save mode for suppressing the power consumption of the image forming apparatus 100 as compared with the normal state is provided, even when the change amount of the interior temperature exceeds the threshold ΔTth during the period in which the power save mode is set, while the configuration is adopted in which the detection color misregistration correction processing or the estimation color misregistration correction processing is not carried out, it is possible to prevent the wasteful toner consumption and the degradation of the toner caused by the drive of the developing device.

While the invention has been described and illustrated in considerable detail with reference to certain embodiments herein, other embodiments are possible as will be understood by those skilled in the art in view of the present disclosure. Additionally, as such, the foregoing illustrative embodiments, examples, features, advantages, and attendant advantages are not meant to be limiting of the present invention, as the invention may be practiced according to various alternative embodiments, as well as without necessarily providing, for example, one or more of the features, advantages, and attendant advantages that may be provided by the foregoing illustrative embodiments.

Systems and modules described herein, and variations thereof, may be implemented in many different configurations comprising any combination(s) of software, firmware, and/or hardware suitable for the purposes described herein. Except to the extent necessary or inherent in the processes themselves, no particular order to steps or stages of methods or processes described in this disclosure, including the Figures, is implied. In many cases the order of process steps may be varied, and various illustrative steps may be combined, altered, or omitted, without changing the purpose, effect or import of the methods described. For example, non-dependent processes and/or acts may be performed in parallel, such as by multiprocessing (e.g., using a multi-core processor and/or multiple processors).

Accordingly, having thus described in detail embodiments of the present invention, it is to be understood that the invention described by the foregoing paragraphs is not to be limited to particular details and/or embodiments set forth in the above description, as many apparent variations thereof are possible without departing from the spirit or scope of the present invention.

What is claimed is:

1. An image forming apparatus provided with a color misregistration correction processing unit, the image forming apparatus comprising:

an image forming unit configured to form color images by using toners in accordance with different colors;

a detection color misregistration correction processing unit configured to respectively form for each of the respective toners one or more color misregistration correction patches of predetermined patterns, respectively detect positions of the respective color misregistration correction patches, detect a color misregistration amount on the basis of the detected positions of the respective color misregistration correction patches, and selectively perform a color misregistration correction processing for performing a color misregistration correction on the basis of the detected color misregistration amount;

an interior temperature monitoring unit configured to monitor an interior temperature of the image forming unit;

a determination unit configured to determine whether or not execution of the color misregistration correction is necessary on the basis of whether or not the interior temperature detected by the interior temperature monitoring unit is put in a predetermined state;

a storage unit configured to store information representing, in a table format, a correlative relation between the interior temperature that can be detected by the interior temperature monitoring unit and at least one color misregistration amount corresponding to the interior temperature;

an estimation color misregistration correction processing unit configured to read out, based on the interior temperature of the image forming unit detected by the interior temperature monitoring unit, the color misregistration amount corresponding to the interior temperature from the storage unit and perform a color misregistration correction processing on the basis of this color misregistration amount;

a mode setting unit configured to switch a color misregistration correction mode of the image forming apparatus between a detection color misregistration correction mode of instructing the detection color misregistration correction processing unit to perform the color misregistration correction processing and an estimation color misregistration correction mode of instructing the estimation color misregistration correction processing unit to perform the color misregistration correction processing; and an image density correction processing unit configured to perform, in the event that image densities of the images formed for the respective toners are out of a previously determined range expected to be normal, an image density correction processing for correcting the image densities of the images, wherein in a case where the determination unit determines that the execution of the color misregistration correction is necessary during a color printing operation, the mode setting unit is configured to set any one of the detection color misregistration correction mode and the estimation color misregistration correction mode as the color misregistration correction mode, and wherein when the densities of the images detected at the time of a last image density correction processing by the image density correction processing unit are equal to or higher than the predetermined threshold, the mode setting unit is configured to set the detection color misregistration correction mode as the color misregistration correction mode of the image forming apparatus, and when the image densities of the images detected at the time of the last image density correction processing by the image density correction processing unit are lower than the predetermined threshold, the mode setting unit is configured to set the estimation color misregistration correction mode as the color misregistration correction mode of the image forming apparatus.

2. The image forming apparatus provided with the color misregistration correction processing unit according to claim 1, wherein in a case where the determination unit determines that the execution of the color misregistration correction is necessary during a monochrome printing operation, the mode setting unit is configured to set the estimation color misregistration correction mode as the color misregistration correction mode of the image forming apparatus.

3. The image forming apparatus provided with the color misregistration correction processing unit according to claim 1, wherein the mode setting unit is configured to set the color misregistration correction mode in accordance with a degradation situation of the toner.

4. The image forming apparatus provided with the color misregistration correction processing unit according to claim 1, further comprising:

an input request unit configured to request a user input of an instruction indicating whether the detection color misregistration correction mode or the estimation color misregistration correction mode is to be set as the color misregistration correction mode of the image forming apparatus in the event that the interior temperature detected by the interior temperature monitoring unit is put in a predetermined state during a color printing operation; and an input operation unit configured to input the instruction indicating whether the detection color misregistration correction mode or the estimation color misregistration correction mode is to be set as the color misregistration correction mode of the image forming apparatus in response to the request by the input request unit, wherein when the detection color misregistration correction mode is selected as the color misregistration correction mode of the image forming apparatus by the input operation unit, the mode setting unit is configured to set the detection color misregistration correction mode as the color misregistration correction mode during the color printing operation of the image forming apparatus, and when the estimation color misregistration correction mode is selected as the color misregistration correction mode of the image forming apparatus by the input operation unit, the mode setting unit is configured to set the estimation color misregistration correction mode as the color misregistration correction mode during the color printing operation of the image forming apparatus.

5. The image forming apparatus provided with the color misregistration correction processing unit according to claim 1, further comprising:

an interior temperature storage unit configured to store the interior temperature detected by the interior temperature monitoring unit.

6. The image forming apparatus provided with the color misregistration correction processing unit according to claim 5, wherein the determination unit is configured to determine whether or not the execution of the color misregistration correction is necessary on the basis of a difference between the interior temperature detected by the interior temperature monitoring unit and the interior temperature detected at the time of a last color misregistration correction processing by the interior temperature monitoring unit and stored in the interior temperature storage unit.

7. The image forming apparatus provided with the color misregistration correction processing unit according to claim 1, wherein in a case where the determination unit determines that the execution of the color misregistration correction is necessary when the monochrome printing operation and the color printing operation are not performed, the mode setting unit is configured to set one of the detection color misregistration correction mode and the estimation color misregistration correction mode as the color misregistration correction mode.

8. The image forming apparatus provided with the color misregistration correction processing unit according to claim 7, wherein the mode setting unit is configured to set the color misregistration correction mode in accordance with a degradation situation of the toners.

9. The image forming apparatus provided with the color misregistration correction processing unit according to claim 1, wherein the detection color misregistration correction processing unit and the estimation color misregistration correction processing unit are configured such that they do not perform the color misregistration correction processing at a time except for a time when a difference between the interior temperature detected in a process of a last color misregistration correction processing by the interior temperature monitoring unit and the interior temperature detected by the interior temperature monitoring unit when a forming operation of an original image is started by the image forming unit is equal to or higher than a predetermined threshold.

10. The image forming apparatus provided with the color misregistration correction processing unit according to claim 1, wherein the interior temperature is a temperature of a surface or a surrounding temperature of a photosensitive drum arranged in the image forming unit.

11. An image forming apparatus provided with a color misregistration correction processing unit, the image forming apparatus comprising:

an image forming unit configured to form color images by using toners in accordance with different colors;

a detection color misregistration correction processing unit configured to respectively form for each of the respective toners one or more color misregistration correction patches of predetermined patterns, respectively detect positions of the respective color misregistration correction patches, detect a color misregistration amount on the basis of the detected positions of the respective color misregistration correction patches, and selectively perform a color misregistration correction processing for performing a color misregistration correction on the basis of the detected color misregistration amount;

an interior temperature monitoring unit configured to monitor an interior temperature of the image forming unit;

a determination unit configured to determine whether or not execution of the color misregistration correction is necessary on the basis of whether or not the interior temperature detected by the interior temperature monitoring unit is put in a predetermined state;

a storage unit configured to store information-representing at least one color misregistration amount with respect to the interior temperature that may be detected by the interior temperature monitoring unit;

an estimation color misregistration correction processing unit configured to read out, based on the interior temperature of the image forming unit detected by the interior temperature monitoring unit, the color misregistration amount corresponding to the interior temperature from the storage unit and perform a color misregistration correction processing on the basis of this color misregistration amount;

a mode setting unit configured to switch a color misregistration correction mode of the image forming apparatus between a detection color misregistration correction mode of instructing the detection color misregistration correction processing unit to perform the color misregistration correction processing and an estimation color misregistration correction mode of instructing the estimation color misregistration correction processing unit to perform the color misregistration correction processing, wherein in a case where the determination unit determines that the execution of the color misregistration correction is necessary during a color printing operation, the mode setting unit is configured to set any one of the detection color misregistration correction mode and the estimation color misregistration correction mode as the color misregistration correction mode; and an image density correction processing unit configured to perform, in the event that image densities of the images formed for the respective toners are out of a previously determined range expected to be normal, an image density correction processing for correcting the image densities of the images, wherein when the densities of the images detected at the time of a last image density correction processing by the image density correction processing unit are equal to or higher than the predetermined threshold, the mode setting unit is configured to set the detection color misregistration correction mode as the color misregistration correction mode of the image forming apparatus, and when the image densities of the images detected at the time of the last image density correction processing by the image density correction processing unit are lower than the predetermined threshold, the mode setting unit is configured to set the estimation color misregistration correction mode as the color misregistration correction mode of the image forming apparatus.

12. An image forming apparatus provided with a color misregistration correction processing unit, the image forming apparatus comprising:

an image forming unit configured to form color images by using toners in accordance with different colors;

a detection color misregistration correction processing unit configured to respectively form for each of the respective toners one or more color misregistration correction patches of predetermined patterns, respectively detect positions of the respective color misregistration correction patches, detect a color misregistration amount on the basis of the detected positions of the respective color misregistration correction patches, and selectively perform a color misregistration correction processing for performing a color misregistration correction on the basis of the detected color misregistration amount;

an interior temperature monitoring unit configured to monitor an interior temperature of the image forming unit;

a determination unit configured to determine whether or not execution of the color misregistration correction is necessary on the basis of whether or not the interior temperature detected by the interior temperature monitoring unit is put in a predetermined state;

a storage unit configured to store information-representing at least one color misregistration amount with respect to the interior temperature that may be detected by the interior temperature monitoring unit;

an estimation color misregistration correction processing unit configured to read out, based on the interior temperature of the image forming unit detected by the interior temperature monitoring unit, the color misregistration amount corresponding to the interior temperature from the storage unit and perform a color misregistration correction processing on the basis of this color misregistration amount;

a mode setting unit configured to switch a color misregistration correction mode of the image forming apparatus between a detection color misregistration correction mode of instructing the detection color misregistration correction processing unit to perform the color misregistration correction processing and an estimation color misregistration correction mode of instructing the estimation color misregistration correction processing unit to perform the color misregistration correction processing, wherein the mode setting unit is configured to set the color misregistration correction mode in accordance with a degradation situation of the toners, and wherein in a case where the determination unit determines that the execution of the color misregistration correction is necessary when the monochrome printing operation and the color printing operation are not performed, the mode setting unit is configured to set one of the detection color misregistration correction mode and the estimation color misregistration correction mode as the color misregistration correction mode; and an image density correction processing unit configured to perform, in the event that image densities of the images formed for the respective toners are out of a previously determined range expected to be normal, a image density correction processing for correcting the image densities of the images, wherein when the image densities of the images detected at the time of the last density correction processing by the image density correction processing unit are equal to or higher than the predetermined threshold, the mode setting unit is configured to set the detection color misregistration correction mode as the color misregistration correction mode of the image forming apparatus, and when the image densities of the images detected at the time of the last image density correction processing by the density correction processing unit are lower than the predetermined threshold, the mode setting unit is configured to set the estimation color misregistration correction mode as the color misregistration correction mode of the image forming apparatus.

* * * * *